United States Patent
Jägemar et al.

(10) Patent No.: US 11,132,220 B2
(45) Date of Patent: Sep. 28, 2021

(54) PROCESS SCHEDULING

(71) Applicant: Telefonaktiebolaget LM Ericsson (publ), Stockholm (SE)

(72) Inventors: Marcus Jägemar, Sigtuna (SE); Sigrid Eldh, Älvsjö (SE); Andreas Ermedahl, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 159 days.

(21) Appl. No.: 16/336,469

(22) PCT Filed: Dec. 16, 2016

(86) PCT No.: PCT/SE2016/051281
§ 371 (c)(1),
(2) Date: Mar. 25, 2019

(87) PCT Pub. No.: WO2018/063045
PCT Pub. Date: Apr. 5, 2018

(65) Prior Publication Data
US 2020/0159572 A1      May 21, 2020

Related U.S. Application Data

(60) Provisional application No. 62/400,353, filed on Sep. 27, 2016.

(51) Int. Cl.
| G06F 9/46 | (2006.01) |
| G06F 9/48 | (2006.01) |
| G06F 9/50 | (2006.01) |
| G06F 9/54 | (2006.01) |

(52) U.S. Cl.
CPC .......... *G06F 9/4881* (2013.01); *G06F 9/5044* (2013.01); *G06F 9/544* (2013.01)

(58) Field of Classification Search
CPC ....... G06F 9/4881; G06F 9/5044; G06F 9/544
See application file for complete search history.

(56) References Cited

U.S. PATENT DOCUMENTS

| 9,401,869 | B1 | 7/2016 | Tang et al. | |
| 10,055,262 | B1* | 8/2018 | Thomas | G06F 9/5083 |
| 2005/0257078 | A1* | 11/2005 | Bose | G06F 11/008 714/1 |
| 2010/0125477 | A1* | 5/2010 | Mousseau | G06F 9/5077 717/177 |
| 2012/0017218 | A1 | 1/2012 | Branson et al. | |

(Continued)

FOREIGN PATENT DOCUMENTS

GB    2527788 A    1/2016

OTHER PUBLICATIONS

Pandruvada S., "Running Average Power Limit—RAPL," Jun. 6, 2014, retrieved from https://01.org/blogs/2014/running-average-power-limit-%E2%80%93-rapl, 4 pages.

(Continued)

*Primary Examiner* — Camquy Truong
(74) *Attorney, Agent, or Firm* — Nicholson De Vos Webster & Elliott LLP

(57) ABSTRACT

Methods, nodes, and a system for process scheduling, as well as corresponding computer programs and computer-program products.

16 Claims, 12 Drawing Sheets

(56) References Cited

U.S. PATENT DOCUMENTS

2016/0179560 A1* 6/2016 Ganguli .............. G06F 9/45558
718/1

OTHER PUBLICATIONS

Wikipedia., "SAR (Unix)," last edited on Nov. 13, 2018, retrieved from https://en.wikipedia.org/w/index.php?title=Sar_(Unix)&oldid=868568010, 3 pages.
International Preliminary Report on Patentability for Application No. PCTSE2016051281, dated Apr. 11, 2019, 9 pages.
Howard David et al., "RAPL: Memory Power Estimation and Capping," Aug. 18-20, 2010, 6 pages, ISLPED '10, Austin, Texas, ACM.
International Search Report and Written Opinion for Application No. PCT/SE2016/051281, dated Jun. 26, 2017, 10 pages.

* cited by examiner

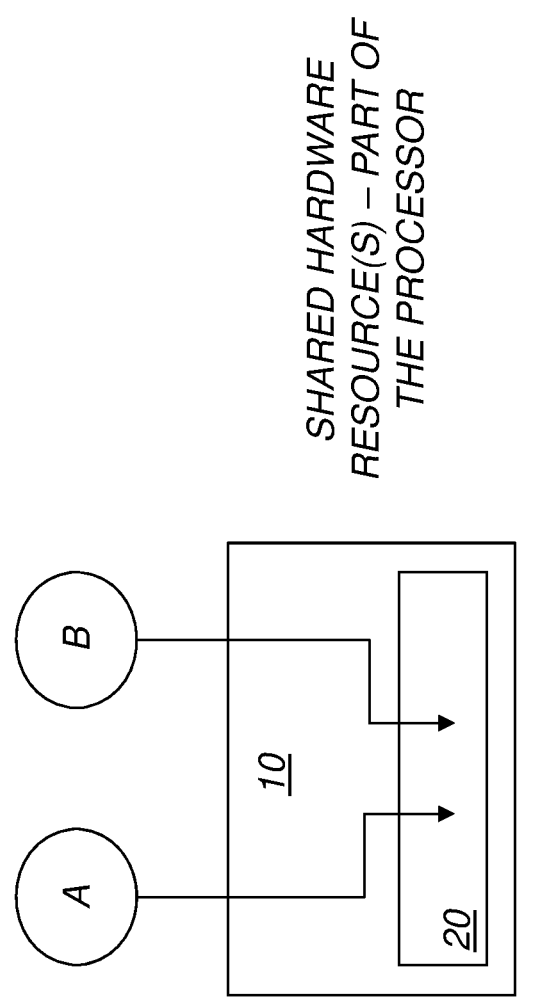

PROCESS SCHEDULING

CROSS-REFERENCE TO RELATED APPLICATIONS

This application is a National stage of International Application No. PCT/SE2016/051281, filed Dec. 16, 2016, which claims priority to U.S. Application No. 62/400,353, filed Sep. 27, 2016, which are hereby incorporated by reference.

TECHNICAL FIELD

The proposed technology generally relates to process scheduling and in particular to methods, nodes, a system for scheduling of processes in a network comprising a plurality of network nodes, as well as corresponding computer programs and computer-program products.

BACKGROUND

Currently existing process schedulers generally divide CPU time between the different processes, or jobs/tasks, based on so-called CPU quanta, each of which normally has a predefined duration of time during which the CPU is allocated for execution of a scheduled process or job.

For example, a round-robin scheduler generally employs time-sharing, giving each process or job a time slot or CPU quantum corresponding to its allowance of CPU time, and interrupting the process or job if it is not completed by then. The process may be resumed next time a time slot is assigned to that process. If the process terminates or changes its state to waiting during its attributed time quantum, the scheduler may select the first process in the ready queue for execution.

Thus process schedulers of today normally use CPU time division as the main mechanism to partition the CPU workload among its scheduled processes. The CPU quanta metric may be adequate for processes belonging to CPU-bound applications but not for so-called Input/Output (I/O) bound applications, such as the type of applications running in communication systems, data-base systems, server-based systems, aircrafts, and other large-scale industrial applications. For the I/O-bound applications, memory accesses or accesses to other type of shared hardware resources may cause congestion and performance bottlenecks.

For many types of hard real-time systems it is necessary to guarantee memory bandwidth for the executing applications. If not, a process may miss its stipulated deadline due to memory stalls. Missing deadlines can cause system instability and system downtime.

It is common to co-locate applications such as I/O-bound communication applications on single-core or multi-core CPUs for cost-saving reasons. Good support for memory scheduling is essential for guaranteeing the desired Quality of Service (QoS) of concurrently executing applications. This is especially important when I/O-bound applications are running in a cloud environment, e.g. inside a virtual machine or a container.

Currently, the industry is required to overprovision hardware resources to guarantee a stable and deterministic execution environment. One process should not affect other processes through using shared hardware resources. Unfortunately, resource overprovisioning is difficult and very costly if absolute performance guarantees should be provided for the applications.

For multi-core based systems the CPU quota alone is not an adequate metric to provide performance guarantees. This is because application processes running on one hardware core may, through accesses to shared resources, affect the performance and behavior of application processes running on other cores. This is especially problematic for the type of I/O-bound applications that are commonly found in telecom systems and other large-scale industrial systems.

There are several ways to address this problem; one common solution is to not use, i.e. turn off, adjacent cores if they are likely to interfere over some shared resource. Another option, as mentioned, is to overprovision the hardware, i.e. make sure that the CPU has sufficient capacity performance and the memory system is dimensioned to handle all type of worst-case shared-resource interference scenarios. Both options are costly to realize and are not utilizing the available hardware resources in an efficient way.

SUMMARY

It is an object to provide methods for enabling scheduling of processes in a network.

Another object is to provide network nodes and a control node configured to enabling scheduling of processes in a network.

Still another object is to provide computer programs for enabling, when executed, scheduling of processes in a processing system.

Yet another object is to provide corresponding computer-program products.

This and other objects are met by embodiments of the proposed technology.

According to a first aspect, there is provided a method for enabling scheduling of processes in a network comprising a plurality of network nodes, each network node having a plurality of processor cores and associated hardware resources and applications running on the network node. The method comprises determining low-level metrics for hardware resources shared among the processes running on each network node; determining system-level metrics associated with the applications running on each network node; providing, from each of said network nodes, said metrics to a control node; determining, in the control node, based on said low-level metrics and said system-level metrics, constraints and/or instructions concerning on which network nodes and processor cores to execute said processes and when to execute said processes; providing, from the control node to each of said network nodes, a message comprising said constraints and/or instructions; and schedule and allocate, in each network node, processes on the processor cores of the network node based on said constraints and/or instructions in said received message.

According to a second aspect, there is provided a system for enabling scheduling of processes in a network comprising a plurality of network nodes, each network node having a plurality of processor cores and associated hardware resources and applications running on the network node. The system being configured to determine low-level metrics for hardware resources shared among the processes running on each node; determine system-level metrics associated with the applications running on each network node; provide said metrics to a control node; determine, based on said low-level metrics and said system-level metrics, constraints and/or instructions concerning on which network nodes and processor cores to execute said processes and when to execute said processes; provide, to each of said network nodes, a message comprising said constraints and/or instructions; and schedule and allocate, in each network node, processes on the processor cores of the network node based on said constraints and/or instructions in said received message.

According to a third aspect, there is provided a method in a network node for enabling scheduling of processes, the network node having a plurality of processor cores and associated hardware resources and applications running on the network node. The method comprising determining low-level metrics for hardware resources shared among the processes running on the network node; determining system-level metrics associated with the applications running on the network node; providing said metrics to a control node; receiving, from the control node, a message comprising constraints and/or instructions concerning on which processor cores to execute processes and when to execute said processes; and scheduling and allocating processes on the processor cores of the network node based on said constraints and/or instructions in said received message.

According to a fourth aspect, there is provided a network node for enabling scheduling of processes, the network node having a plurality of processor cores and associated hardware resources and being configured to run applications on the network node. The network node being configured to: determine low-level metrics for hardware resources shared among the processes running on the network node; determine system-level metrics associated with the applications running on the network node; provide said metrics to a control node; receive, from the control node, a message comprising constraints and/or instructions concerning on which processor cores to execute processes and when to execute said processes; and schedule and allocate processes on the processor cores of the network node based on said constraints and/or instructions in said received message.

According to a fifth aspect, there is provided a method in a control node for enabling scheduling of processes in a network comprising a plurality of network nodes. The method comprising receiving, from said plurality of network nodes, low-level metrics for hardware resources shared among processes running on each network node; receiving, from said plurality of network nodes, system-level metrics associated with the applications running on each network node; determining, based on said low-level metrics and said system-level metrics, constraints and/or instructions concerning on which network nodes and processor cores to execute said processes and when to execute said processes; and providing to each of said network nodes, a message comprising said constraints and/or instructions.

According to a sixth aspect, there is provided a control node for enabling scheduling of processes in a network comprising a plurality of network nodes. The control node being configured to receive, from said plurality of network nodes, low-level metrics for hardware resources shared among processes running on each network node; receive, from said plurality of network nodes, system-level metrics associated with applications running on each network node;

determine, based on said low-level metrics and said system-level metrics, constraints and/or instructions concerning on which network nodes and processor cores to execute said processes and when to execute said processes; and provide to each of said network nodes, a message comprising said constraints and/or instructions.

According to a seventh aspect, there is provided a computer program, for enabling, when executed, scheduling of processes in a network node having a plurality of processor cores and associated hardware resources and being configured to run applications on the network node. The computer program comprises instructions, which when executed by at least one processor, cause the at least one processor to determine low-level metrics for hardware resources shared among the processes running on the network node; determine system-level metrics associated with the applications running on the network node; provide said metrics to a control node; receive, from the control node, a message comprising constraints and/or instructions concerning on which processor cores to execute processes and when to execute said processes; schedule and allocate processes on the processor cores of the network node based on said constraints and/or instructions in said received message.

According to an eight aspect, there is provided a computer program, for enabling, when executed, a control node to control scheduling of processes in a network comprising a plurality of network nodes. The computer program comprises instructions, which when executed by at least one processor, cause the at least one processor to receive, from said plurality of network nodes, low-level metrics for hardware resources shared among processes running on each network node; receive, from said plurality of network nodes, system-level metrics associated with the applications running on each network node; determine, based on said low-level metrics and said system-level metrics, constraints and/or instructions concerning which processes to execute on which network nodes and on which processor cores to execute said processes; and provide to each of said network nodes, a message comprising said constraints and/or instructions.

According to a ninth aspect, there is provided a computer program product comprising a computer readable medium having stored thereon a computer program according to any of the seventh or eighth aspects.

An advantage of the proposed technology is that shared resource aware scheduling makes it possible to schedule and allocate processes in a more optimal way compared to traditional CPU-load based process schedulers.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 2 is a schematic diagram illustrating yet another example of a processing system in which hardware resources are shared by at least two processes, where at least one of the shared hardware resources is part of the processor(s) on which the processes execute.

DETAILED DESCRIPTION

Figure 1A:
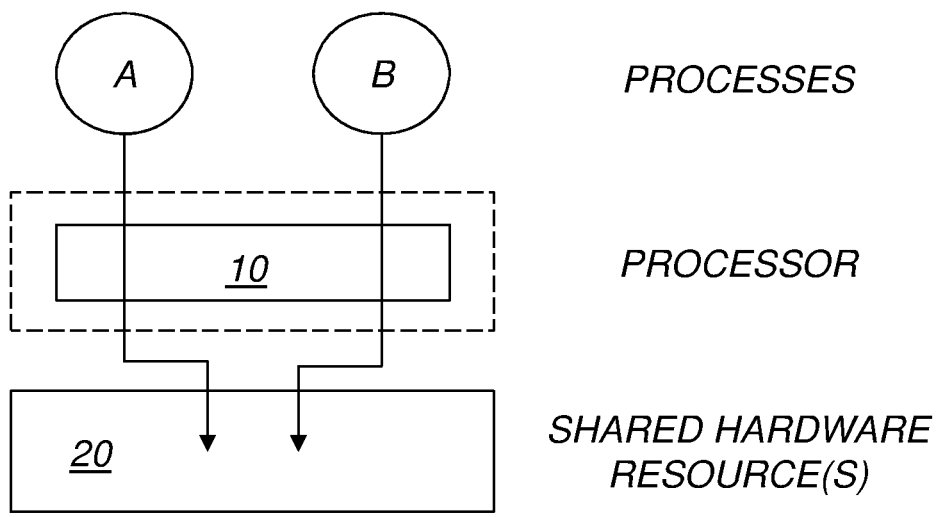
FIG. 1A is a schematic diagram illustrating an example of a processing system in which hardware resources are shared by at least two processes.

Throughout the drawings, the same reference designations are used for similar or corresponding elements.

For a better understanding of the proposed technology, it may be useful to begin with a brief system overview of a hardware-based processing system having one or more processors and associated hardware resources. The present disclosure describes a method to increase the overall system performance by assisting operating system (OS) process schedulers to utilize shared resources more efficiently. The method may use hardware (HW)-, OS-, software (SW)- and system-level performance counters to profile shared resource usage of each process and to determine how sensitive each process is for shared resource interference. The method may utilize a big-data approach to collect and analyze statistics from many nodes running the same system setup. The result of the analysis may be a decision support model which can be deployed to the nodes and used by the respective nodes' OS process scheduler when taking scheduling and allocation decisions. A node can here be seen as one part of a larger system, said part comprising one operating system instance and may include nodes comprising single-processor boards up to multi subrack boards.

A scheduling decision is here meant the decision of which processes to run and may also include the decision when to run these processes.

A process scheduler handles processes as the scheduling entity when selecting the execution order among the total set of processes available for execution.

An allocation decision is here meant the decision of which cores to run the processes on.

The term process is meant to encompass both low-level hardware processes as well as higher-level processes, such as applications, virtual machines, containers as well as other schedulable entities. As used herein, the non-limiting term "process" may refer to a process, job, thread, or any other task suitable for execution in a processing system. Depending on the Operating System, OS, a process may also be made up of multiple jobs, tasks or threads of execution that execute instructions concurrently.

An advantage with a shared resource aware scheduler is that it can schedule and allocate processes in a more optimal way compared to traditional CPU-load based OS process schedulers, taking into account the characteristics of the node hosting the processes and considering previous scheduling and allocation decisions made by the node and also decisions made by other nodes may be considered. A shared resource aware process scheduler will be substantially more efficient than current CPU-load based process schedulers.

In the following text, the method will be described by using a process concept and is applicable for use in a low-level execution environment such as CPUs and cores and higher level systems in a cloud environment Throughout the drawings, the same reference designations are used for similar or corresponding elements.

For a better understanding of the proposed technology, it may be useful to begin with a brief system overview of a hardware-based processing system having one or more processors and associated hardware resources.

The processors are sometimes referred to as processor cores, or simply cores, and sometimes also referred to as Central Processing Units, CPUs. Any processor or CPU may comprise one or more processor cores.

The processor(s) may be general purpose processor(s), or special-purpose processor(s), or a hybrid thereof.

A special-purpose processor may use custom processing circuits and a proprietary Operating System, OS, for execution of software to provide one or more of the features or functions disclosed herein.

A general purpose processor may use a common off-the-shelf, COTS, processor and a standard OS, for execution of software configured to provide one or more of the features or functions disclosed herein.

The hardware resources may be part of the processor(s) such as processor pipeline resources and/or execution branch resources, but is often processor-external hardware resources such as cache and/or other memory in connection with the processor(s). A wide variety of non-limiting examples of hardware resources will be given later on.

The processes may originate from one or more applications such as those mentioned previously, and the applications in turn may be executed more or less directly on a physical processing system or, alternatively, on one or more Virtual Machines, VMs, using virtualization, as will be explained in more detail later on. In the latter case, the VMs may for example be implemented on a Virtual Server or packed into a so-called Container. An application may include one or more processes together with data and/or configuration information.

FIG. 1A is a schematic diagram illustrating an example of a processing system in which hardware resources are shared by at least two processes. In this particular example, two processes A and B execute on the same processor 10 and share at least part of the associated hardware resources 20.

Figure 1B:
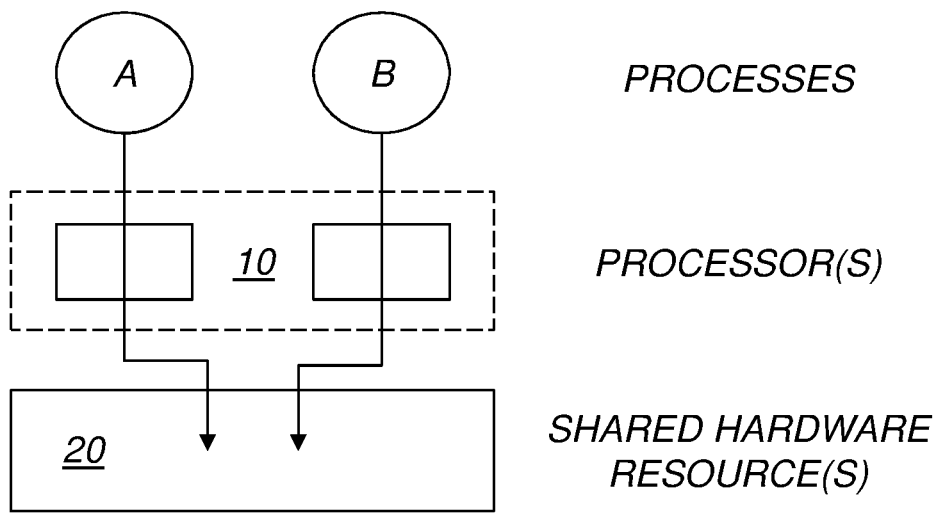
FIG. 1B is a schematic diagram illustrating another example of a processing system in which hardware resources are shared by at least two processes.

FIG. 1B is a schematic diagram illustrating another example of a processing system in which hardware resources are shared by at least two processes. In this particular example, two processes A and B execute on different processors 10, while sharing at least part of the associated hardware resources 20.

FIG. 2 is a schematic diagram illustrating yet another example of a processing system in which hardware resources are shared by at least two processes. In this particular example, at least one of the shared hardware resources 20 is part of the processor(s) 10 on which two processes A and B execute.

In a multicore system, each core shares some resources with other core(s). Shared resources can become a performance bottleneck as a result of how processes are scheduled, what kind of tasks each process performs and how the cores share resources. For example a process that executes on one core becomes in a wait-state until other processes can finalize its use of the shared resource. These shared resources could be hardware resources, for example, caches, branch prediction units and memory buses.

Figure 3:
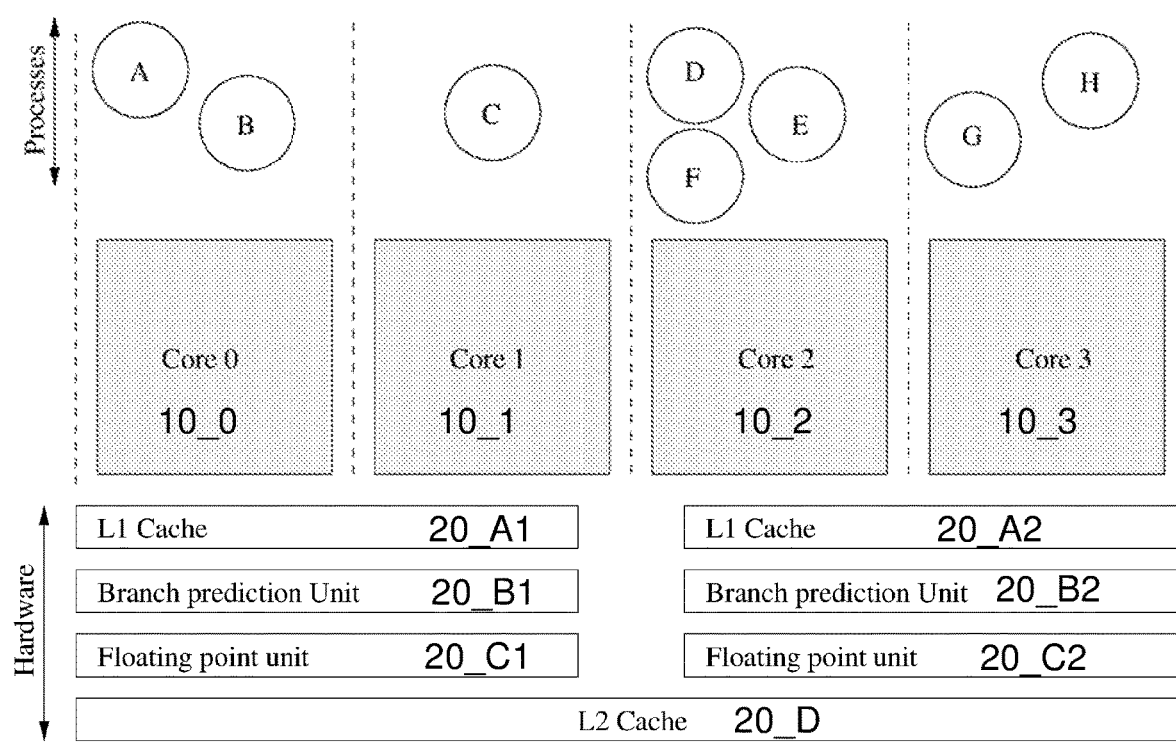
FIG. 3 is a schematic diagram illustrating an example of a processing system in which a plurality of processes A to H execute on different processor cores 0-3, and all share at least one level of cache memory, including level 2 cache.

A typical problem that occurs for IO-bound systems is when the total working set is larger than the size of the available cache memory. A working set is the complete amount of data that an application works with. If the working set is larger than the available cache memory it will cause cache-misses since a new working-set access must evict a previous cache member. Such a cache eviction, i.e. a cache miss, will cause an execution slowdown. Process A and B in FIG. 3 execute on core 0, 10_0, which share common hardware, 20_A1, 20_131, 20_C1, 20_D. Here it is assumed that process A is exercising a large working set and will therefore reduce the available cache memory for process B. If process B is response-time sensitive, it may miss its execution deadlines because process A causes a high number of cache evictions for all processes using the same shared cache. Further, it can be seen that many other processes A-H are sharing hardware resources in different ways. For example, processes C and E are sharing the L2 cache 20_D even though they are running on different cores (10_1 and 10_2 respectively) and are not sharing any other hardware resource (20_A1-C1 and 20_A2-C2 respectively).

Traditional process schedulers in e.g. Linux, Windows, and other operating systems does not consider shared resources. Such traditional process schedulers merely monitor the execution time of each process and may therefore distribute processes inefficiently.

Figure 4:
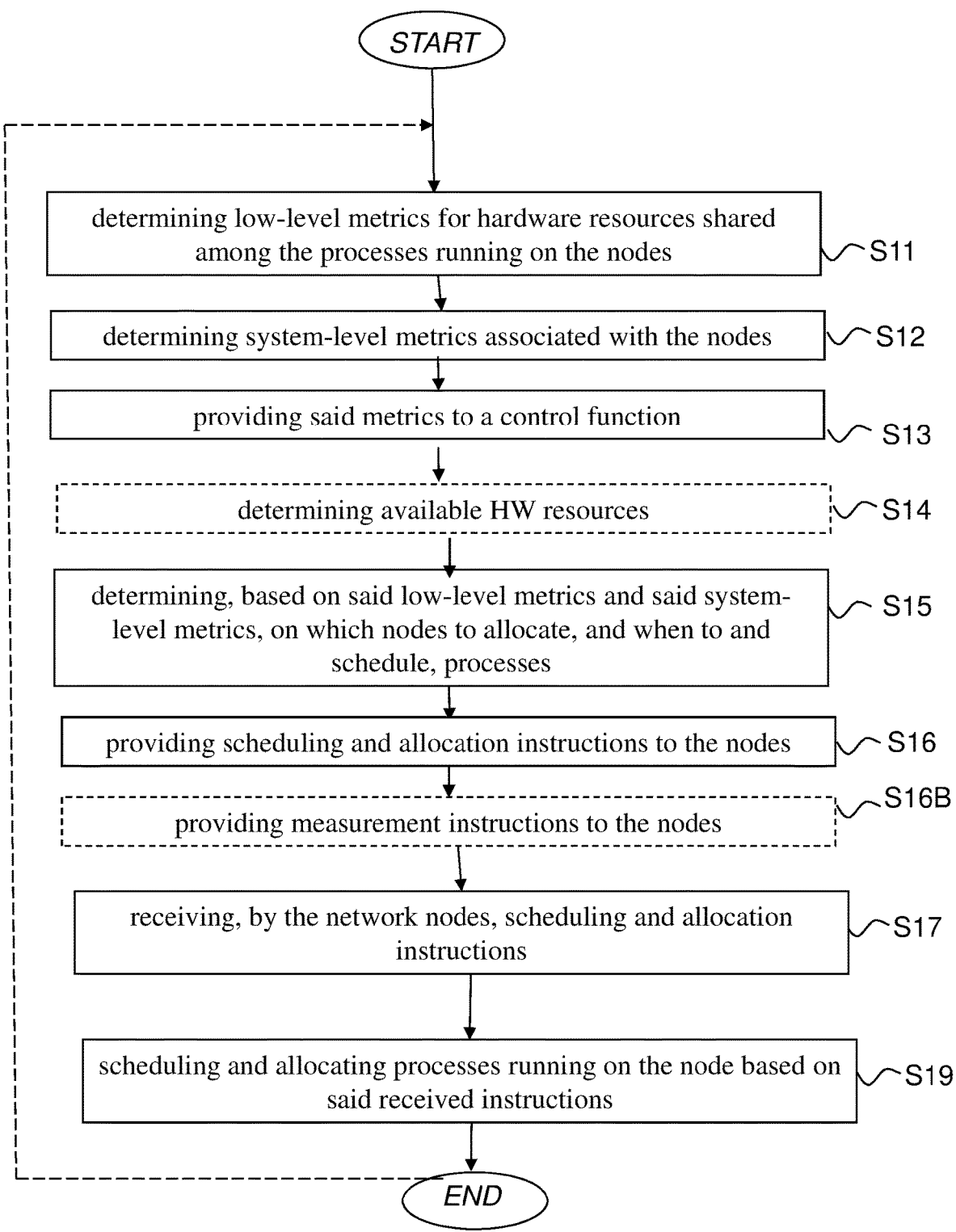
FIG. 4 is a schematic flow diagram illustrating an example of a method for enabling scheduling of processes in a network comprising a plurality of nodes, the nodes having at least one processor and associated hardware resources, where at least one of the hardware resources being shared by at least two of the processes.

FIG. 4 is a schematic flow diagram illustrating an example of a method for enabling scheduling of processes in a network comprising a plurality of nodes, each of the nodes having a plurality of processor cores and associated hardware resources.

The method comprises:

S11: determining low-level metrics for hardware resources shared among the processes running on the nodes.

S12: determining system-level metrics associated with applications running on the nodes.

S13: providing, from each of the nodes, said metrics to a control function.

S14 (optional): determining the available hardware resources of the nodes.

S15: determining, based on said low-level metrics and said system-level metrics, constraints and/or instructions concerning which processes to execute on which nodes and on which processor cores to execute the processes.

S16: providing, from the control function, a message comprising said constraints and/or instructions to each of the nodes.

S16B (optional): providing, from the control function, measurement instructions to the nodes, the measurement instructions comprising a defined subset of which low- and/or system-level metrics the nodes should determine.

S17: receiving, from the control node, a message comprising constraints and/or instructions concerning on which processor cores to execute processes and when to execute said processes.

S19: scheduling and allocating processes on the processor cores of the network node based on the constraints and/or instructions in the received message.

Figure 5B:
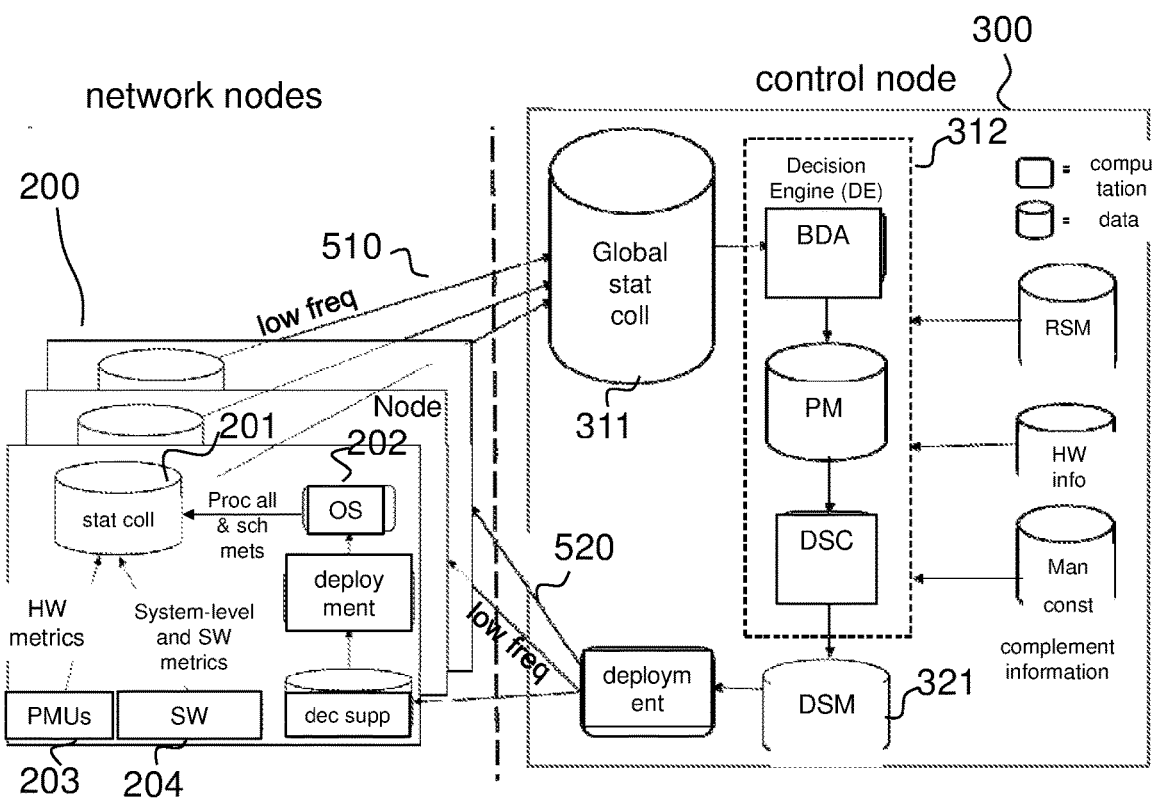
FIG. 5B is another schematic block diagram illustrating a network comprising a plurality of network nodes and a control node.
Figure 5A:
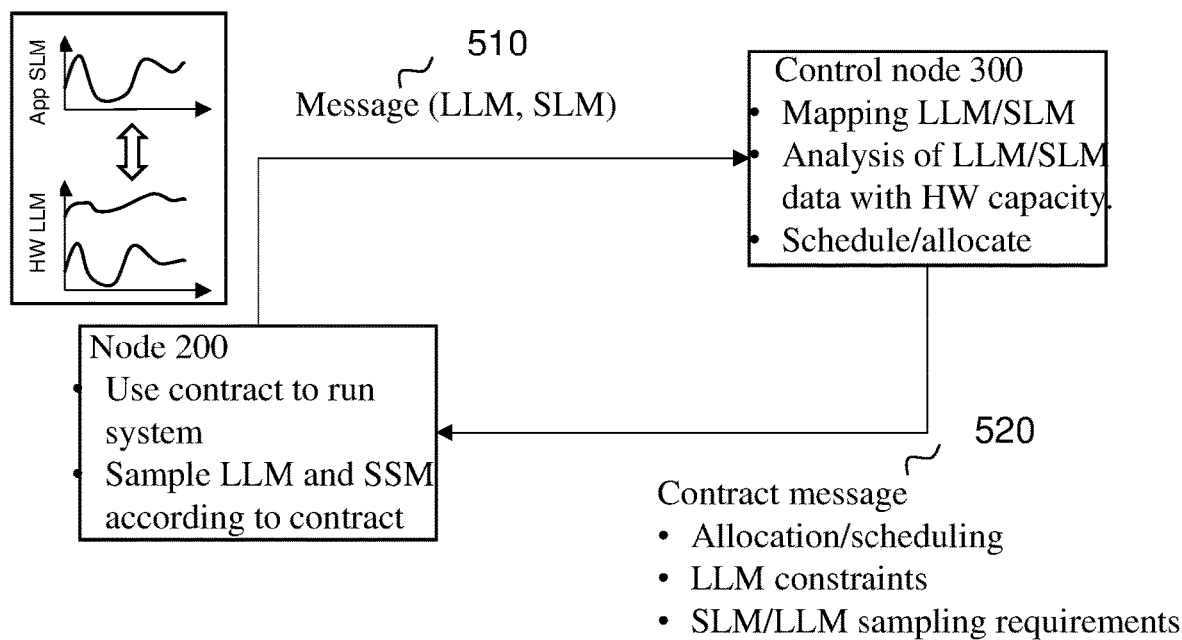
FIG. 5A is a schematic block diagram illustrating a network node and a control node and their message exchange.

FIG. 5A is a schematic block diagram illustrating a network node 200 and a control node 300 and some different measures that each of these nodes take as well as their message exchange. As previously described the network node 200 determines low-level metrics for the hardware resources, which gives an indication on how the processes running on the cores are utilizing the underlying hardware resources, see step S11 in e.g. FIG. 4 where the low-level metrics includes, but is not limited to cache usage, branch-prediction statistics, floating point usage or any other hardware shared resource. Low-level metrics are metrics indicating the performance of the hardware. Low-level metrics are typically not aware of the system function of the process it describes. It is easily comparable between different processes because a low-level metric describes the actual hardware resource usage and is not tied to the actual functionality of a process.

The network node 200 also determines system-level metrics associated with the node, which gives an indication on how the node is performing on system-level, i.e. how the applications running on the node are performing, see step S12 in e.g. FIG. 4. The system-level metrics described in step S12 includes message transmission time, message throughput, bandwidth or any other metric on system level. System level metrics are typically measured on a higher-level where system performance is measurable. This means that system level metrics can be measured in conjunction to the applications consisting of one or several processes.

Low-level metrics are determined from the hardware and OS-level metrics are determined from the operating system, whereas system-level metrics which is higher-level metrics, may be determined from the application and provides a description of the software itself. System-level metrics defines the system-level performance of an application with a hardware agnostic value. However, the system-level metrics does not describe the hardware usage by itself; instead it specifies the user-experienced performance of an application. If an application has several processes the system-level metrics may describe the total performance of all cooperating processes. Any metric can be either continuously measured or sampled at intervals. In step S13, at least the low-level metrics and system-level metrics will be provided to a control function, preferably by transmitting one or more messages 510 comprising the determined metrics to a control node. This control function will be further described below, and may be located in a separate node in the network. In FIG. 5A as well as below, the abbreviations LLM and SLM are short for low-level metrics and system-level metrics, respectively.

As an example the low-level metrics message provided to the control function may contain the following fields:

A time stamp (2016-11-17.08:18:46.872351).
The core where the measure(s) were taken.
The measurement period (time length).
The pid (process identity) if defined, or −1 for system-wide events.
A multiple of tuples containing {EVENT_NAME, VALUE} where EVENT_NAME is defined in the instructions between the control node and and the measuring node. VALUE is a numerical value representing the counter defined by EVENT_NAME.

In an embodiment that will be further described below, metrics on OS level, including but not limited to, context switch time and interrupt frequency, may also be determined for the nodes. OS-level metrics are metrics indicating the performance of the operating system.

After the control node receives the message 510 it extracts the information relating to the different metrics. The control node then compares the received set of low-level metrics with the set of system-level metrics and may then construct a mapping between these, i.e. how the sets of low-level and system-level metrics correlate to one another. Note that the mapping could either be done on subsets of or on the entire set of low-level and system-level metrics. The control node may then use this mapping to determine how to allocate and schedule processes on the node as well as on other nodes of the network, see step S15 of FIG. 4. The control node may use knowledge of the available hardware resources of the node and the mapping of the metrics to create a contract that can constrain and specify how processes can execute on the available hardware resources of the network nodes. The scheduling and allocation information may then be transmitted to the node in a contract message 520, see step S16 of FIG. 4. The contract message 520 may also specify what low-level metrics the node should determine prior to the next message 510 is transmitted from the node to measure. In the node 200, the contract message 520 will be received, see step S17 of FIG. 7 and an operating system of the node will schedule and allocate low-level processes on the node based on the received instructions, see step S19 of FIG. 7.

As an example, by way of the described method it may be observed that a process running on a core of the node uses a lot of the available hardware resources, this will be shown by the determined low-level metrics. By also determining the system-level metrics it will be determined how one or more applications executing on the node are performing. By analyzing the correlation between these two metrics it is possible to continuously construct a mapping between low-level metrics for the hardware resources being shared among the processes running on the node and system-level metrics associated with the node. The control node may use this mapping together with the low-level metric capacity of the node in order to create a scheduling and allocation model that can constrain and specify how processes should execute on the available hardware of the node. The model may also specify what low-level metrics for the node to measure.

In order to further exemplify, the method may continuously measure a set of low-level metrics and a set of system-level metrics. These different sets may comprise one or many metrics that may be analyzed using big-data analysis in order to find correlations between the different available metrics. This may result in that some system-level metrics will correlate to some low-level metrics. The low-level metrics that does not correlate to system-level metrics may be excluded from the next measurement iteration.

As an illustrative example, the following metrics are measured during a first iteration 1:
LLM1={Nr_L1_Data_Cache_Evictions,
Nr_L1_Instruction_Cache_Evictions,
Nr_Floating_Point_Instructions,
Nr_Branch_Mispredictions}
SLM1={Nr_Messages_Processed}

During an analysis of the determined metrics it was seen that one low-level metric correlated to one system-level metric, namely the number of L1 data cache evictions correlated to the number of processed messages:

(Nr_L1_Data_Cache_Evictions->Nr_Messages_Processed). The remaining low-level metrics does not correlate to the system-level metrics, which makes it possible to omit them during the next iteration resulting in the following sample matrix for iteration 2 where two additional metrics have speculatively been added. The DE may speculatively add additional metrics to improve the correlation between low-level metrics and system-level metrics.

The following metrics may then be measured during a second iteration 2:
LLM2={Nr_L1_Data_Cache_Evictions,
Nr_L2_Data_Cache_Evictions,
Nr_L2_Instruction_Cache_Evictions}
SLM2={Nr_Messages_Processed}.

Depending on the outcome of the analysis of the second iteration, the low-level metrics and the system-level metrics to be determined in following iterations may then be modified.

The method as described above with reference to FIG. 5A may provide a process scheduling mechanism that enforce Quality of Service, QoS, by not letting processes exceed their shared resource usage constraints as stipulated by the contract message 520. The method may further increase overall system and network performance by allocating and distributing processes more efficiently with regards to shared resource usage.

With reference to FIG. 5B an example of how the invention can be implemented will be described. The method may be seen as comprising different parts that may be performed in different nodes. A first part, illustrated in the left hand side of FIG. 5B and corresponding to the steps S11-S13 above, consists of functionality in the respective nodes that may monitor node behavior to extract information on HW-, OS-, SW- and system-level performance. The metrics may be continuously collected and stored in a node-local data structure, e.g. a database or a file. Some statistical analysis of the collected metrics may be performed at the node, i.e., the needed data storage space should typically be much smaller than the raw metrics. At regular intervals, a unit here denoted a node-local statistics collector 201 transfers the collected statistical data to a global statistical collector 311. The global statistics collector 311 may be located at a control node 300 separate from the respective nodes, but it could also be co-located with a node for which node the statistics are collected. The transfer between a node 200 and global statistics collector 311 may, for example, occur at recurring time intervals or at points in time when the nodes are less occupied. The obtained data may be stored in a database where it is possible to deduce system-wide effects of earlier scheduling decisions. The database may include information about type of metric, time stamp, node function measured and which node the measurements come from. The global statistics collector unit 311 may use different techniques to reduce the overall data-set size, for example compression and removal of duplicated/unusable data.

A second part of the method illustrated in the right part in FIG. 5B and corresponding to the steps S15-S16 above, may comprise analyzing the data that has been collected from different nodes and use the data to derive a decision support model to be deployed to the nodes for use by the node's OS process scheduler when taking scheduling and/or allocation decisions. The global collector 311 stores statistical data from several nodes during many report periods. The second part can be implemented in a same node as the one collecting all the metrics in steps S11-S12, but can also be performed by a separate node and as a cloud service.

Step S15 is carried out using the knowledge of both system- and low-level metrics provided from the various network nodes. System-level metrics describe application performance in a more accurate manner than low-level metrics does. However, system-level metrics for one process is usually not comparable with system-level metrics for a different process, making comparisons between system-level metrics for different processes less suitable as basis for process scheduling decisions. A mapping between system-level metrics and low-level metrics alleviates the complexity of system-level metrics comparisons by comparing low-level metrics for the processes.

In step S16 the control function thus provides instructions and/or constraints concerning which processes should be run on the nodes and when these should be run. These instructions and/or constraints are provided to the respective operating system of the nodes. The instructions and/or constraints regard to on which cores to execute which processes and/or on which cores certain processes should not be executed.

The control node 300, in which the global statistics collector unit 311 may reside, comprises a decision engine (DE) 312. One function of the DE 312 is to interpret statistics obtained from the different nodes and find correlations between current scheduling parameters and the performance of individual processes as well as the performance of the system as a whole. The DE accepts additional offline inputs, for example, a software resource sensitivity model, a hardware information model and manually defined constraints. These models will be further described below. Such additional input/data may be provided to allow additional input to the DE in order for the DE to make accurate allocation and scheduling decisions. The DE may also map system level performance metric(s) to low-level metrics. Using such mappings aims to maintain the desired system-level performance by monitoring and scheduling using low-level metrics.

The DE may be seen as comprising different parts, a big-data analysis (BDA) unit, performance model (PM) and decision support creation (DSC) unit. The BDA may use machine learning or any other analytical method to evaluate the statistical data producing a performance model, which will be further described below. The BDA may recognize several execution patterns, which is exemplified in the following list of constraints. Process A uses the same shared resource as process B. They should not execute on the same core because it may lead to shared resource congestion.

Process A requires a certain amount of shared resources and should therefore execute on a specific core where there is sufficient shared resource available.

Process A should execute on a specific core because it requires a certain resource that is only present for a limited number of execution units in a heterogeneous processor.

Process A has had a specific recurring historical shared resource usage. This can trigger the DE to assume that the same scenario will occur again and act upon it in advance.

The Performance Model (PM) may describe how processes perform for different process distributions over the cores and shared resource cluster. The PM may contain an aggregated view of the performance of all processes in the system as well as the performance of the system as a whole. The PM may be continuously or intermittently updated with information supplied by the BDA unit. The PM may describe how various processes utilize hardware resources and how the performance of each process is affected by shared resource bottlenecks. The PM may be continuously updated and refined throughout the system lifetime. The PM typically comprises information such as, but not limited to, the following examples:
Cache usage.
The number of floating point instructions executed per second.
System-level performance degradation as a function of shared resource contention.
Number of context switches for each process.
Number of stalls for each process depending on shared resource contention.

Based on the PM, the DSC unit may be used to derive a decision and scheduling support model (DSM) 321, see the lower right part of FIG. 5B.

The DSC unit may e.g. determine whether or not to allocate and schedule two different processes on the same core based on their compatibility with each other. The DSC unit may also determine to allocate and schedule a process that for various reason is not suited for being processed on the same core as other processes.

There are numerous more scenarios where the BDA can define a constraint and the previous list only includes a limited number of them.

The DSC unit may use the given constraints as input and generate explicit constraints that are easily distributable to all nodes throughout the system.

The output of the DSC unit is the Decision and Scheduling support Model (DSM). The DSM contains concrete allocation and scheduling suggestions, constraints and/or directives/instructions. The DSM typically contains information such as, but not limited to, the following examples:
Process A should run on core 0.
Process B should not run on core 0.
Core 3 should not have any scheduled processes.
Process A should not cause more than X cache misses per second.
Process A and B should be co-located on core 0.
Process A should be halted.
Process A and B should be co-located on core 0 and A should not cause more than X floating point instructions.
The DSM may be continuously or intermittently updated by the DSC unit.

The software Resource Sensitivity Model (RSM) is optional and provides the application-level performance degradation as a function of shared resource contention. The RSM can also describe resource usage over the life-span of the application. For example, but not limited to, the following:
Application-level performance when the L1-cache is shared with an application that utilizes a large portion of the cache.
Cache usage over time.
Cache usage for certain input to the application.
Floating point usage.
Recurring events pre-programmed in the application, for example timer-interrupts etc.

The RSM can be created off-line using techniques that investigate how application-level performance is affected by shared resource congestion and shortage. It is also possible to create the RSM by using on-line techniques.

The hardware (HW) info model is also optional and provides the architecture, structure and capacity for each shared resource within the HW. The HW model contains many parameters describing the HW capabilities, for example, but not limited to, the following list:
  Number of processors and/or cores.
  Heterogeneous HW capabilities, possibly only available for a limited subset of processors and/or cores.
  Cache mapping to each processors and/or core.
  Cache threshold sizes and cache sizes.
  Cache bandwidth.
  DRAM access time/DRAM bandwidth.
  HW floating point support.
  Max number of floating point instructions per second.

The HW model is created offline for each supported HW type. It is possible to create the HW model using various types of probing techniques that automatically detects the capacity and limitations to the HW.

There is usually a vast organizational knowledge on the behavior of most systems. Engineers have experienced many complex situations that may be difficult to detect automatically. It is, therefore, possible to manually define constraints to be used during the evaluation phase. For example, but not limited to, the following list:
  Process A should not run on the same core as process B.
  Process A should run on the same core as process B.
  Process A should explicitly run on core n and process B on core m.
  Process C should execute solely on a specific core with no additional processes.
  A specific core should not be used for process scheduling (possibly used for bare-metal processes).
  Process A is not allowed to generate more than a certain number of cache evictions for the L1 cache.

The manually defined constraints are defined offline.

The DE can also draw conclusions and create allocation and scheduling constraints using the input from one node and apply it to other nodes in the system. For example, process A when executing on the same core as process B on Node X, caused shared resource congestion, then this information may be included as a clear instruction to other nodes of the system.

The update frequency may differ from the frequency in which the data are collected and analyzed. An update of the DSM may, for example, be started when the global analysis detects that the nodes have performed poorly concerning some key system-level metrics.

The analysis may optionally use information on the hardware layout of the involved nodes. Manually given constraints provided by the system designer can add complementary information.

Assuming that all nodes have identical or at least similar system setups and are running in similar environments it is possible to derive a PM that is valid for all nodes. However, the analysis method may be able to detect when this is no longer true, and it may thus also produce a set of specialized models, each valid for a subset of nodes. For a first subset of nodes with similar system setups when it comes to the number and sizes of cores and the associated hardware resources, a first decision model may be provided whereas a second subset of nodes with a different system setup may be provided with a second decision model.

The resulting decision and scheduling support model DSM 321 are deployed to nodes, preferably by transmitting one or more contract messages 520 comprising scheduling and allocation instructions and/or constraints to each node. This can either occur at regular intervals or when the analysis has detected that there is a need to update the scheduling and allocation of processes at one or more of the nodes. Preferably the instructions and/or constraints are transmitted with low frequency to reduce side-effects on the system. It is also possible, but not necessary, to add additional functionality to reduce the system performance impact, for example, compression and a reduction of similar constraints. Examples of "low frequency" will vary depending on the system in which the method is implemented. For example, a system with a short response time may require an update every millisecond while a typical telecom system may suffice with an update every ten seconds is meant a low-enough frequency to reduce side-effects on the system.

The OS process scheduler 202, running at the node 200, utilize the deployed DSM 321 to make on-line process allocation and scheduling. This can for example result in a situation where certain processes are never allocated on adjacent cores because the cores share some hardware resource(s). It is also possible for the OS process scheduler to limit the process shared resource usage depending on the contract received from DSM, for example by controlling execution of a process based on a usage bound of the number of allowable accesses by the process to a shared hardware resource, by halting execution of the process when the number of allowable accesses has been reached. After halting the process, the OS process scheduler may start execution of a next process and in a similar manner control execution of this next process based on a usage bound of the number of allowable accesses by this next process to a shared hardware resource. The DSM may be easily and quickly accessible by the OS process scheduler 202. In general, the frequency in which the OS process scheduler 202 access the provided model may be magnitudes smaller than the frequency with which the OS process scheduler 202 dispatch processes on the CPU cores.

It is also possible to derive an initial input to the DSM 321 by using test nodes instead of production nodes, i.e. by deploying the node setup in a test environment prior to installing them in the field. Such use-case can substantially reduce the initial learning time needed by a newly deployed system.

The method may be modular and use one or several models as input when deciding how to distribute processes. In the following other components illustrated in FIG. 5B will be described.

The method may use any measurable metric as a basis for making scheduling decisions. Even though some examples of measurable metrics are described in the subsequent sections, the method should not be seen as limited to these types of metrics.

A node-local statistics collector 201 may obtain metrics providing information on both HW-, OS-, SW- and system-level performance. Each metric measured and/or sampled in the respective nodes may be provided with a time stamp that is well-defined throughout all nodes in the network of interest. The time stamp may be a globally distributed time stamp and may be used to locate the system behavior when a performance problem is detected and subsequently deciding how to avoid such problems by making a corrective scheduling decision. The information can for example be stored in a database including information about type of metric, time stamp and location.

The node-local statistics collector 201 can also perform basic statistical operations on the measured data, for example filtering out undesired measurements or samples or compressing the data to save space.

The node-local statistics collector unit 201 obtains information from a number of node internal units. For example, a Performance Monitor Unit (PMU) 203 may provide low-level metrics by determining low-level performance counters, for example concerning the CPU and/or the cores. These low-level metrics may describe the current hardware utilization and how well the CPU and/or the cores execute the current processes. The low-level metric may quantify the usage of a shared resource in order to make it possible to compare the shared resource usage of multiple processes. Thereby the mapping between system-level metrics and low-level metrics makes it possible to quantify the shared resource usage of a process corresponding to its performance supplied by the system-level metrics.

Some examples of low-level metrics that may be central to process execution time are:
  Number cache evictions per second.
  Floating point performance such as floating point instructions per second.
  Branch prediction unit performance such as number of branch mispredictions per second.
  Instructions per cycle.
  DRAM accesses per second.

Monitoring the hardware usage of a system often utilize a simple approach to determining the PMU counters, see the procedure described below as an example:
  1. Program the PMU to count a certain hardware event.
  2. Set a time.
  When the time expires, read the PMU counter and store the result.

The PMU is also commonly referred to as a hardware performance counter. Such hardware performance counter can be seen as special-purpose registers built into modern microprocessors to store the counts of hardware-related activities within computer systems.

As previously indicated, the method may be used to control execution of processes originating from one or more applications.

For example, the application(s) may even be running inside Virtual Machines, VMs, or containers.

By way of example the network nodes may be configured to operate with a shared hardware resource that includes at least one of the following examples:
  a memory and/or cache resource;
  a processor pipeline resource;
  an execution branch resource;
  a Translation Lookaside Buffer, TLB, resource;
  a Floating Point, FP, operation/instruction resource;
  a processing interrupt resource;
  a Single Instruction Multiple Data, SIMD, vector instruction resource; and
  a Multiple Instruction Multiple Data, MIMD, vector instruction resource.

It is also possible to use other standard hardware metrics samplers, for example System Activity Report (SAR) or Running Average Power Limit (RAPL).

The node-local statistics collector unit 201 may also obtain information from an OS unit 202 providing OS metrics. The OS metrics describe the current performance of the system and/or the performance of the executing processes. An OS system metric can for example be:
  Number of context switches/second.
  The time to perform a context switch.
  Number of interrupts/second.
  Process distribution over the processor and/or the cores.
  Memory mapping and its performance.

It is possible to obtain OS system metrics in many ways, for example by calling system specific API calls or by other means where the OS is exporting internal metrics. One example of such a function would be, the /proc-file system in Linux.

The node-local statistics collector unit may also obtain information from unit SW 204, providing software metrics and system-level metrics. The SW unit 204 measures system-level metrics and measures high-level application performance. Such metrics can for example be:
  Message round-trip time measured between processes running either on the same core, adjacent cores or in other parts of the system/network.
  Message processing time.
  Number calculations per second.
  Number of packets processed per second.
  Number of application operations completed per second.
  Number of clients handled per second.
  Number of operations completed.

Software-level metrics may be software specific counters or metrics describing the performance of a currently executing application, such as number of objects processed per second, number of loop iterations per second, code size. System-level metrics may be determined on a group of software or applications, such as number of applications running in the system, packets processed by the system, bandwidth to an external communication party from the systems' point of view.

Going back to the left hand side of FIG. 5B, a node-local deployment unit may use the data, i.e. the allocation and scheduling instructions and/or constraints provided by the control node 300 and influence a node local OS process allocator/scheduler 202. The node-local deployment unit can implement several methods to fulfil the scheduling instructions such as, but not limited to, the following examples:
  Modify internals of OS process scheduler (tune virtual runtime for currently existing Linux kernels).
  Fora Linux kernel a desired process allocation can be achieved by using the sched_setaffinity( ) function.
  OpenStack API may be utilized to schedule virtual machine according to node-local deployment directives.

In the following some of the fundamental information stored in each model shown in FIG. 5A will be described. The actual information content may however vary depending on several parameters such as hardware architecture, software usage, software design and system usage pattern.

Industrial large-scale systems use common shared resource hardware because it is much cheaper to obtain compared to tailor-made hardware. The described method can reduce the deployment cost of large-scale systems because it is possible to consolidate many processes on hardware with shared resources.

Furthermore, the method may be implemented as an add-on to the OS process scheduler and may not affect application code at all, which is beneficial for systems with a large legacy code base.

Figure 6:
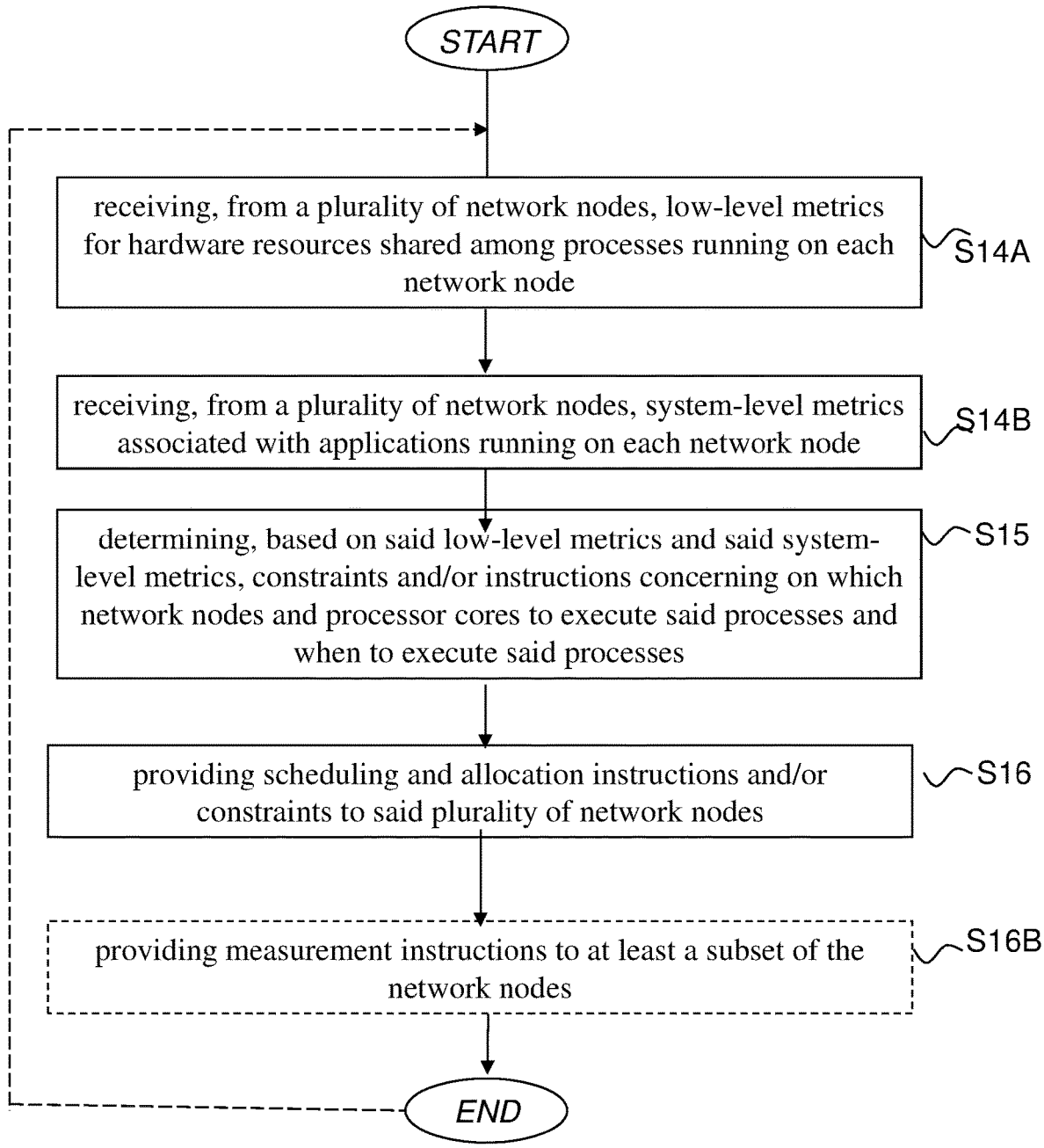
FIG. 6 is a schematic flow diagram illustrating an example of a method for enabling scheduling of processes in a control node.

FIG. 6 is a schematic flow diagram illustrating an example of a method in a control node for enabling scheduling of processes in a network comprising a plurality of nodes. The method comprises:

S14A: receiving, from a plurality of network nodes, low-level metrics for hardware resources shared among processes running on the nodes.

S14B: receiving, from a plurality of network nodes, system-level metrics associated with the nodes, in particular with applications running on each network node.

S15: determining, based on said low-level metrics and said system-level metrics, on which of said plurality of network nodes to allocate and when to schedule, processes. More specifically the control node determines constraints and/or instructions concerning on which network nodes and processor cores to execute said processes and when to execute said processes.

As part of the determining in S15 the control node may from the low-level metrics how a process utilizes the shared hardware resources and determine if there is a correlation between the low-level metrics for the process and how the applications running on the network nodes are performing by comparing the low-level metrics for the process with the system-level metrics.

As part of the determining in S15 the control node may analyze and consider the available hardware resources of the network nodes prior to determining instructions concerning which processes to execute on which network nodes and on which processor cores to execute said processes.

S16: providing scheduling and allocation instructions and/or constraints to said plurality of network nodes.

S16B (optional): providing, from the control function, instructions regarding which measurements on low-level and/or system-level, the nodes should perform. Since there may be hardware limitations as to the number of low-level metrics that may be determined at the same time and the fact that different processes uses hardware resources differently, it may in some cases be necessary to include which low-level metrics should be determined for which core and for which process. So the instructions may thus e.g. include the instruction to measure the number of cache evictions for process A on core 0.

The measurement instructions may thus be provided to at least a subset of the network nodes, the measurement instructions comprising a defined subset of which low- and/or system-level metrics the network nodes should determine and the measurement instructions may comprise instructions to measure one or more low-level metrics that affect the system-level metrics.

The measurement instructions, which could also be called sampling directives, provided from the control function could be formatted as the following example where each counter set is defined within curly braces. The "name" and "Descr" for each counter set is defined for ease of reading. Each low-level metric is defined by E0 through E3 for a particular type of hardware. For other types of hardware there may be fewer or larger number of event counters available. The "pid" parameter can either be an explicit integer process id or process name or −1 for system-wide events.

The "core" parameter is either one or several cores or −1 for all available cores.

```
[
    {
        "Name" : "CPI/IPC", (Cycles Per Instruction/Instructions
        Per Cycle)
        "E0"   : "INST_RETIRED.ANY", (Number of instructions
        executed)
        "E1"   : "CYCLE_ACTIVITY.STALLS_L2_PENDING",
        (L2 cache statistics)
        "E2"   : "CYCLE_ACTIVITY.CYCLES_L2_PENDING",
        (L2 cache statistics)
        "E3"   : "L1D.REPLACEMENT", (L1 Data cache statistics)
        "Descr": "Process specific CPI/IPC",
        "Pid"  : "testrun_core0",
        "Core" : "−1"
    },
    {
        "Name" : "L1 Cache", (Various instruction cache statistics)
        "E0"   : "ICACHE.HIT",
        "E1"   : "ICACHE.MISSES",
        "E2"   : "ICACHE.IFETCH_STALL",
```

-continued

```
        "E3"   : "ICACHE.IFDATA_STALL",
        "Descr": "—",
        "Pid"  : "testrun_core0",
        "Core" : "−1"
    },
    {
        "Name" : "ITLB", (Instruction Translation Lookaside Buffer
        (TLB) statistics. The TLB manages the memory management unit
        (MMU))
        "E0"   : "ITLB_MISSES.MISS_CAUSES_A_WALK",
        "E1"   : "ITLB_MISSES.WALK_COMPLETED_4K",
        "E2"   : "ITLB_MISSES.WALK_COMPLETED_2M_4M",
        "E3"   : "PAGE_WALKER_LOADS.EPT_ITLB_L2",
        "Descr": "—",
        "Pid"  : "testrun_core0",
        "Core" : "−1"
    },
    {
        "Name" : "DTLB", (Data Translation Lookaside Buffer)
        "E3"   :
        "DTLB_LOAD_MISSES.MISS_CAUSES_A_WALK",
        "E0"   : "DTLB_LOAD_MISSES.WALK_COMPLETED",
        "E1"   : "DTLB_LOAD_MISSES.STLB_HIT",
        "E2"   : "DTLB_STORE_MISSES.WALK_COMPLETED",
        "Descr": "—",
        "Pid"  : "testrun_core0",
        "Core" : "−1"
    },
    {
        "Name" : "CPI/IPC",
        "E0"   : "INST_RETIRED.ANY_P",
        "E1"   : "CYCLE_ACTIVITY.STALLS_L2_PENDING",
        "E2"   : "CYCLE_ACTIVITY.CYCLES_L2_PENDING",
        "E3"   : "L1D.REPLACEMENT",
        "Descr": "Process specific CPI/IPC",
        "Pid"  : "testrun_core1",
        "Core" : "−1"
    }
]
```

Figure 7:
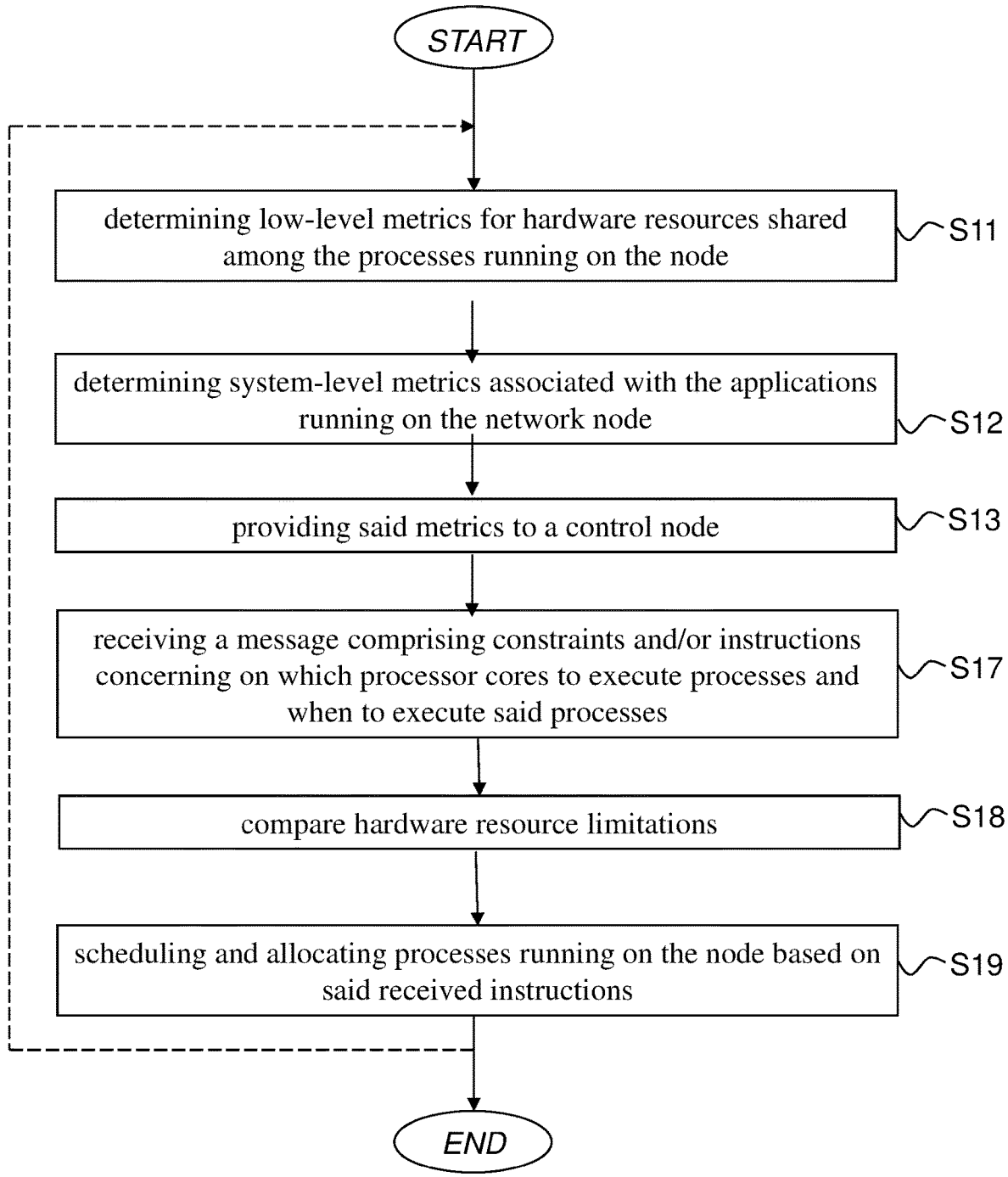
FIG. 7 is a schematic flow diagram illustrating an example of a method for enabling scheduling of processes in a network node.

FIG. 7 is a schematic flow diagram illustrating an example of a method in a network node for enabling scheduling of processes in a network comprising a plurality of nodes. The network node having at least one processor and associated hardware resources, where at least one of the hardware resources being shared by at least two of the processes. The method comprises:

S11: determining low-level metrics for hardware resources shared among the processes running on the node.

S12: determining system-level metrics associated with the node.

S13: providing said metrics to a control node.

S17: receiving instructions and/or constraints from the control node.

S18: compare hardware resource limitations of the network node with the instructions and/or constraints of the contract message 520.

S18 may include by an operating system in each the network node, determining that any instructions received from the control node does not exceed the hardware resource limitations of the network node, prior to scheduling and allocating in accordance with the instructions.

S18 may include by an operating system in each the network node, determining that the constraints received from the control node are compatible with the hardware resource limitations of the network node, prior to scheduling and allocating the processes on the node.

S19: scheduling and allocating processes running on the node in accordance with said received instructions and/or constraints.

In step S19, the operating system of the node uses the instructions received from the control function for allocating and scheduling processes on the cores of the node. The operating system should follow the received instructions unless these instructions for example exceed the node's available hardware resources.

In some embodiments the instructions received from the control function also comprise instructions regarding which measurements the node should perform in steps S11 and S12. In could e.g. be the case that the control function has instructed the node to execute two processes (A, B) on the same core and these two processes could impact one another. For example, when they execute together process A should not cause more than a certain number of floating point instructions and it is therefore important that the node measures the number of floating point instructions.

Figure 11A:
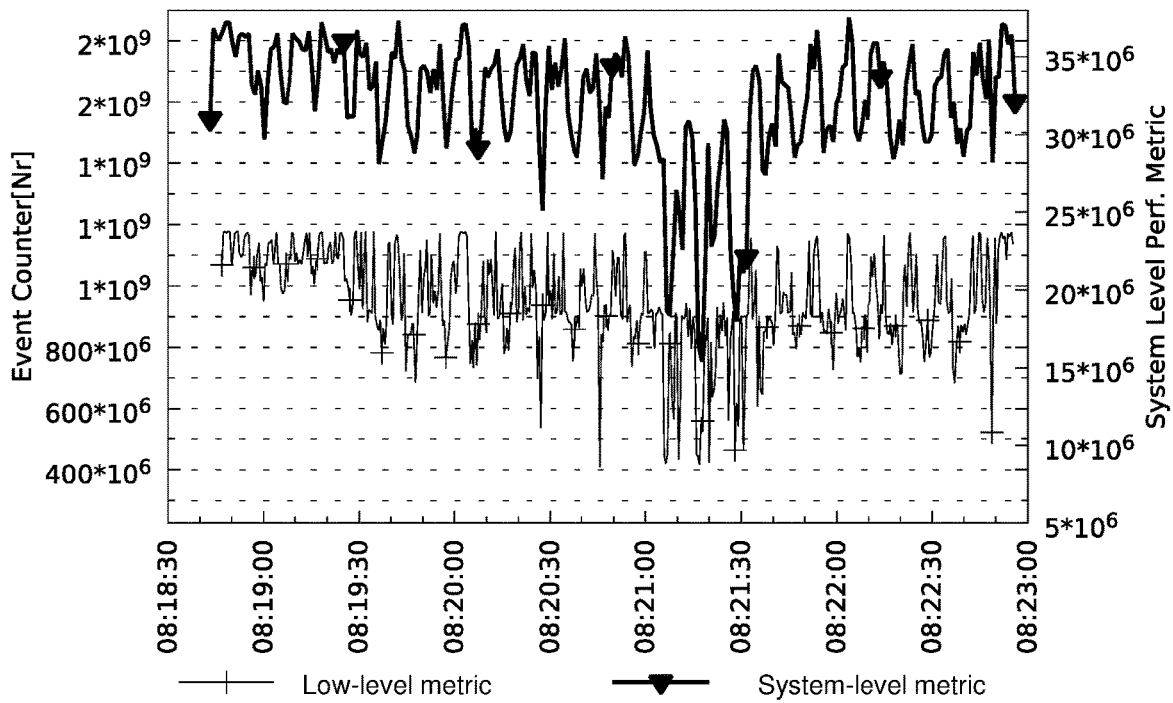
FIGS. 11A and 11B are diagrams illustrating how different low-level metrics and system-level metrics vary over time.

FIG. 11A is a diagram illustrating how a low-level metric and a system-level metric varies over time. FIG. 11A shows a scenario where the low-level metric curve is correlated to the system-level metric curve. The correlation between low-level metric and system-level metric provides a mapping of low-level metric to system-level metric such that changes in low-level metric affect the system-level metric meaning that a reduction of the available quantity of a low-level metric reduces the performance of the monitored process. In short, the system-level performance of the monitored process is a function of the usage of low-level resources.

Figure 11B:
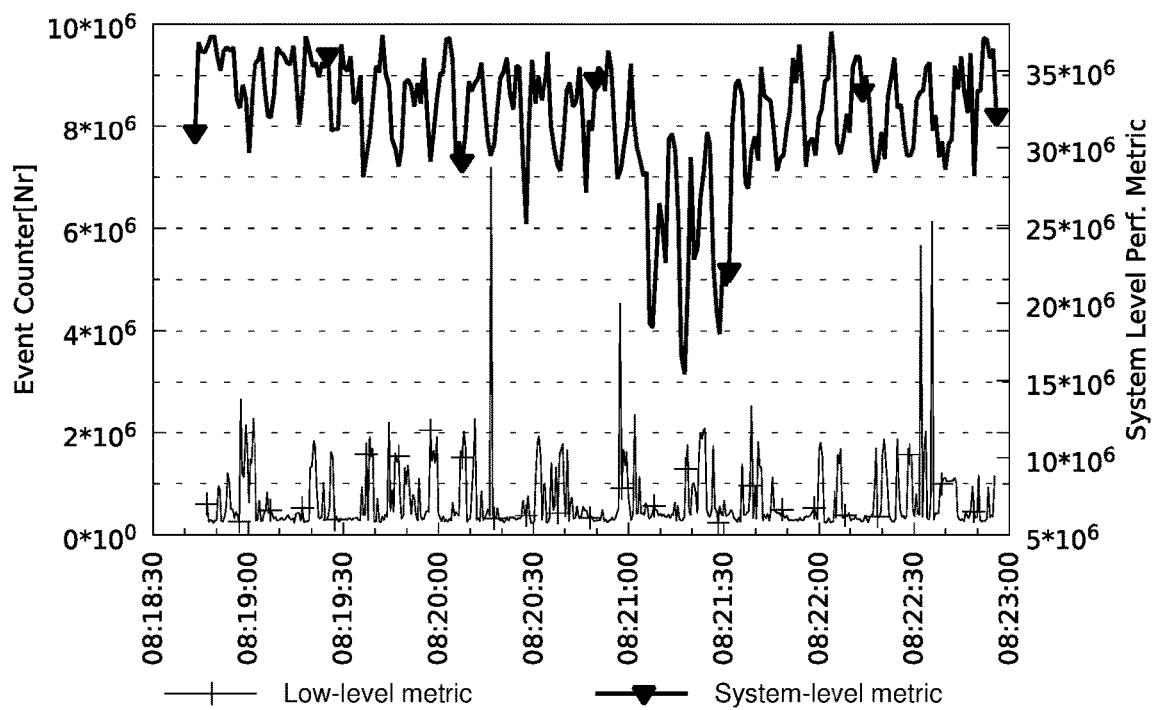

FIG. 11B is another diagram illustrating how another low-level metric and a system-level metric varies over time. FIG. 11B shows a scenario where the low-level metric does not correlate with the system-level metric. This is also a vital feedback to the decision engine since it can easily be deduced that this low-level metric does not need to measure the next interval (for the monitored process). Such decisions is vital to reduce:

1) the number of low-level metrics to monitor at the deployed nodes, thus reducing the probe effect and overall system impact.

2) the amount of data being sent between the node and the control node.

3) the amount of data processed by the decision engine.

The decision engine 312 may for each different set of low-level metrics see if individual low-level metrics correlate with the system-level metrics. Every such correlation may be stored in a database of mappings between {LLM_0, LLM_1, . . . , LLM_n} (where LLM equals low-level metrics) and one or more system-level metrics. Such a database can be accomplished by machine learning. For performance reasons, identifying the low-level metrics that don't correlate with system-level metrics may be almost as important as determining the low-level metrics that map to system-level metrics. Correlations and dependencies between the different metrics may be determined in many ways using any of the available statistical metrics, see for example en.wikipedia.org/wiki/Correlation_and_dependence.

Figure 8:
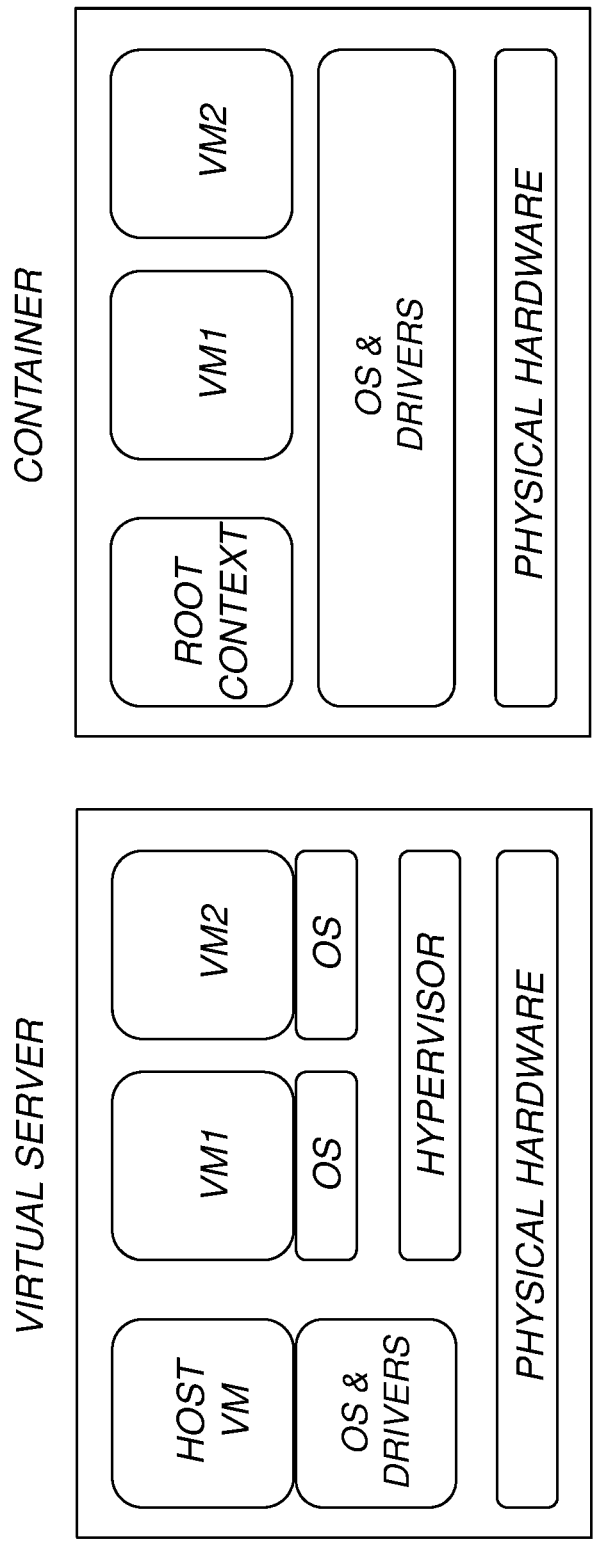
FIG. 8A is a schematic diagram illustrating an example of a Virtual Server implementing a number of Virtual Machines.
FIG. 8B is a schematic diagram illustrating an example of a Container solution implementing a number of Virtual Machines in a more light-weight form of virtualization.

FIG. 8A is a schematic diagram illustrating an example of a Virtual Server implementing a number of Virtual Machines. In a Virtual Server there is normally a hypervisor isolating the VMs such as VM1 and VM 2 from each other.

FIG. 8B is a schematic diagram illustrating an example of a Container solution implementing a number of Virtual Machines in a more light-weight form of virtualization. In a container, there is usually no need for a hypervisor layer. Instead, the OS is shared by the VMs.

It should also be understood that any of the techniques for virtualization may be recursively nested, if desired. By way of example, it is possible to run a VM inside another VM, which in turn runs inside yet another VM, and so on. Another example involves running a container inside a VM, or the other way around. The processes to be considered for scheduling by the process scheduler may be executed on any of these VMs and/or containers on one or more of the recursive levels.

It is also possible to envisage scenarios where a programming language involves a number of processes that are scheduled with respect to shared hardware resources. For example, a processing system may execute a VM running an OS, and the OS may be handling a process, which runs a programming language that involves some form of scheduling of threads and/or programming language processes. A wide variety of different scenarios that involve different levels and/or forms of virtualization can also be envisaged.

By way of example, for telecom and/or network applications, so called Virtual Network Element(s) (VNEs) may be implemented and used to perform network functionality. This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

The proposed mechanism may be used for any type of shared hardware resource, especially where there are suitable means for measuring performance metrics on low-level and system-level.

Example—Computer Implementation

Figure 9:
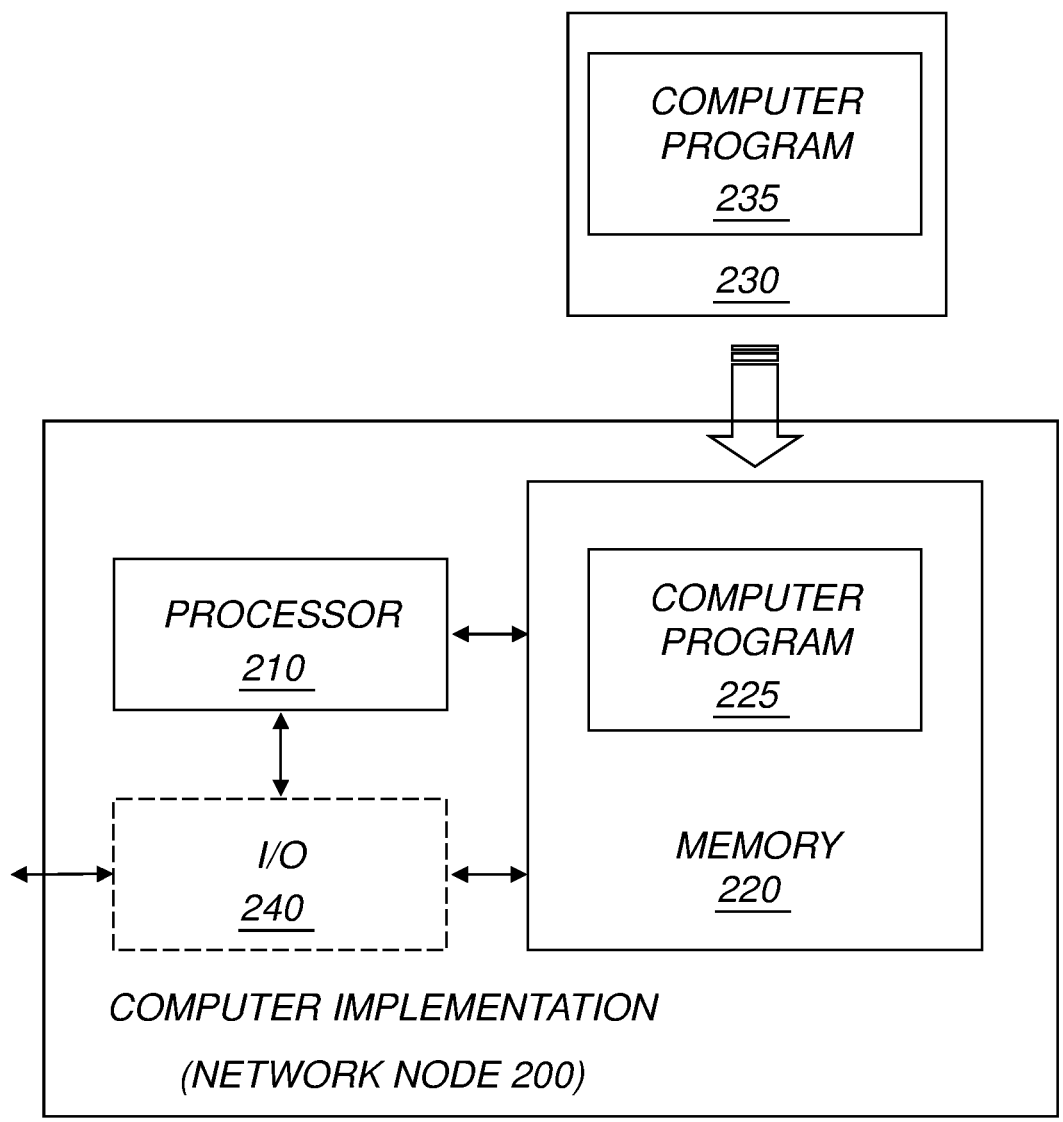
FIG. 9 is a schematic diagram illustrating an example of a computer implementation suitable for a network node.

FIG. 9 is a schematic diagram illustrating an example of a computer implementation suitable for a network node. In this particular example, at least some of the steps, functions, procedures, modules and/or blocks described herein are implemented in a computer program 225; 235, which is loaded into the memory 220 for execution by processing circuitry including one or more processors 210. The processor(s) 210 and memory 220 are interconnected to each other to enable normal software execution. An optional input/output device 240 may also be interconnected to the processor(s) 210 and/or the memory 220 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 210 is thus configured to perform, when executing the computer program 225, well-defined processing tasks such as those described herein.

The processing circuitry does not have to be dedicated to only execute the above-described steps, functions, procedure and/or blocks, but may also execute other tasks.

In a particular embodiment, there is provided a computer program 225; 235 for enabling, when executed, scheduling of processes in a processing system having at least one processor and associated hardware resources, at least one of the hardware resources being shared by at least two of the processes. The computer program 225; 235 comprises instructions, which when executed by at least one processor 210, cause the at least one processor 210 to perform some or all of the steps described above and associated with the network nodes illustrated on e.g. the left hand side of FIGS. 5A and 5B.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

Figure 10:
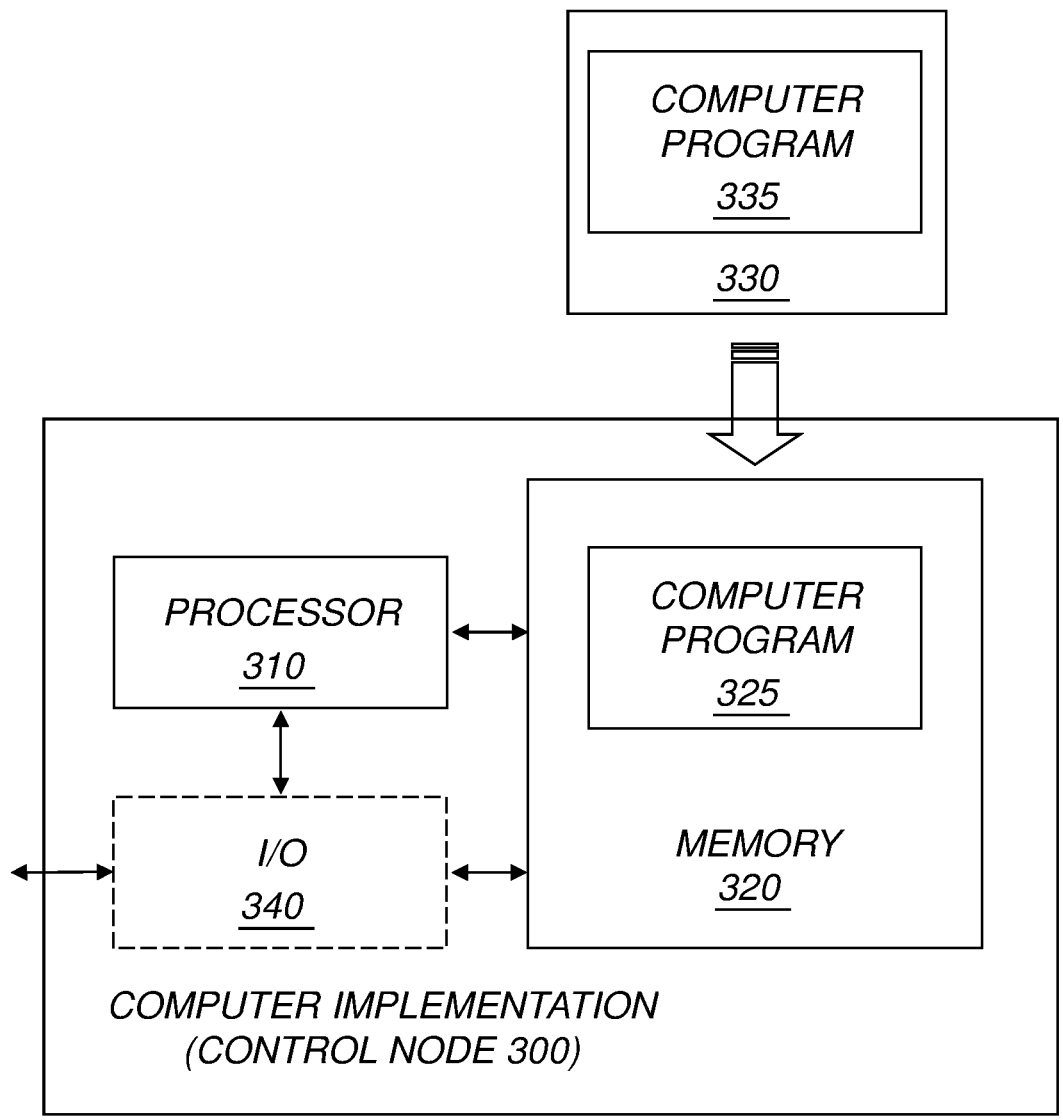
FIG. 10 is a schematic diagram illustrating an example of a computer implementation suitable for a control node.

FIG. 10 is a schematic diagram illustrating an example of a computer implementation suitable for a control node. In this particular example, at least some of the steps, functions, procedures, modules and/or blocks described herein are implemented in a computer program 325; 335, which is loaded into the memory 320 for execution by processing circuitry including one or more processors 310. The processor(s) 310 and memory 320 are interconnected to each other to enable normal software execution. An optional input/output device 340 may also be interconnected to the processor(s) 310 and/or the memory 320 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 310 is thus configured to perform, when executing the computer program 325, well-defined processing tasks such as those described herein.

The processing circuitry does not have to be dedicated to only execute the above-described steps, functions, procedure and/or blocks, but may also execute other tasks.

In a particular embodiment, there is provided a computer program 325; 335 for enabling, when executed, scheduling of processes in a processing system having at least one processor and associated hardware resources, at least one of the hardware resources being shared by at least two of the processes. The computer program 325; 335 comprises instructions, which when executed by at least one processor 310, cause the at least one processor 310 to perform some or all of the steps described above and associated with the network nodes illustrated on e.g. the right hand side of FIGS. 5A and 5B.

The proposed technology also provides a carrier comprising the computer program, wherein the carder is one of an electronic signal, an optical signal, an electromagnetic signal, a magnetic signal, an electric signal, a radio signal, a microwave signal, or a computer-readable storage medium.

By way of example, the software or computer programs 225; 235; 325; 335 may be realized as computer program products, which are normally carried or stored on a computer-readable medium 220; 230; 320; 330, in particular a non-transitory medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 12:
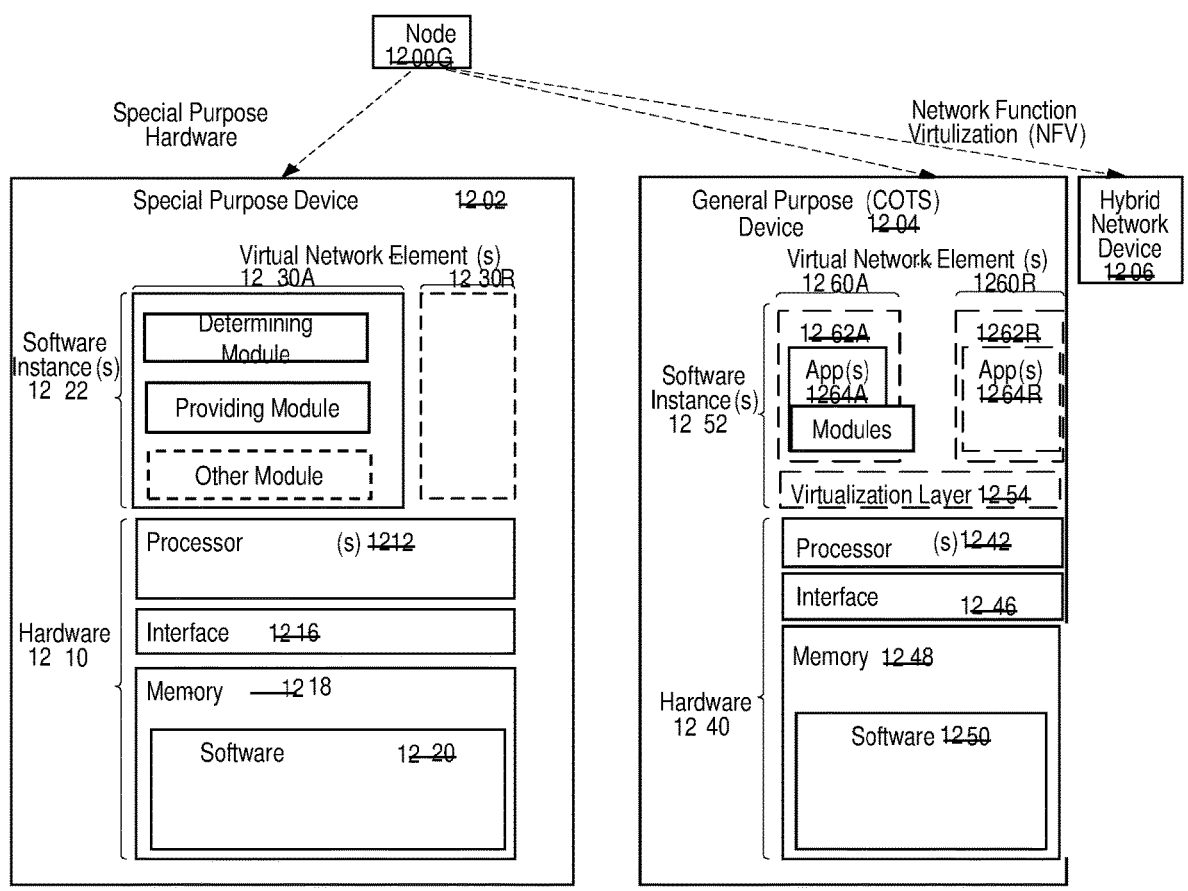
FIG. 12 illustrates three specific examples of a node that may be used to implement particular embodiments of the described solution.

FIG. 12 illustrates two specific examples of how the network nodes 200 and/or the control node 300 may be implemented in certain embodiments of the described solution including: 1) a special-purpose network device 1202 that uses custom processing circuits such as application-specific integrated-circuits (ASICs) and a proprietary operating system (OS); and 2) a general purpose network device 1204 that uses common off-the-shelf (COTS) processors and a standard OS which has been configured to provide one or more of the features or functions disclosed herein.

Special-purpose network device 1202 includes hardware 1210 comprising processor(s) 1212, and interface 1216, as well as memory 1218 having stored therein software 1220. In one embodiment, the software 1220 implements the modules and/or features described with regard to the previous figures. During operation, the software 1220 may be executed by the hardware 1210 to instantiate a set of one or more software instance(s) 1222. Each of the software instance(s) 1222, and that part of the hardware 1210 that executes that software instance (be it hardware dedicated to that software instance, hardware in which a portion of available physical resources (e.g., a processor core) is used, and/or time slices of hardware temporally shared by that software instance with others of the software instance(s) 1222), form a separate virtual network element 1230A-R. Thus, in the case where there are multiple virtual network elements 1230A-R, each operates as one of the network devices from the preceding figures.

Returning to FIG. 12, the example general purpose network device 1204 includes hardware 1240 comprising a set of one or more processor(s) 1242 (which are often COTS processors) and interface 1246, as well as memory 1248 having stored therein software 1250. During operation, the processor(s) 1242 execute the software 1250 to instantiate one or more sets of one or more applications 1264A-R. While certain embodiments do not implement virtualization, alternative embodiments may use different forms of virtualization. For example, in certain alternative embodiments virtualization layer 1254 represents the kernel of an operating system (or a shim executing on a base operating system) that allows for the creation of multiple instances 1262A-R called software containers that may each be used to execute one (or more) of the sets of applications 1264A-R. In this embodiment, software containers 1262A-R (also called virtualization engines, virtual private servers, or jails) are user spaces (typically a virtual memory space) that may be separate from each other and separate from the kernel space in which the operating system is run. In certain embodiments, the set of applications running in a given user space, unless explicitly allowed, may be prevented from accessing the memory of the other processes. In other such alternative embodiments virtualization layer 1254 may represent a hypervisor (sometimes referred to as a virtual machine monitor (VMM)) or a hypervisor executing on top of a host operating system; and each of the sets of applications 1264A-R may run on top of a guest operating system within an instance 1262A-R called a virtual machine (which in some cases may be considered a tightly isolated form of software container that is run by the hypervisor). In certain embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1240, directly on a hypervisor (in which case the unikernel is sometimes described as running within a LibOS virtual machine), or in a software container, embodiments can be implemented fully with unikernels running directly on a hypervisor represented by virtualization layer 1254, unikernels running within software containers represented by instances 1262A-R, or as a combination of unikernels and the above-described techniques (e.g., unikernels and virtual machines both run directly on a hypervisor, unikernels and sets of applications that are run in different software containers).

The instantiation of the one or more sets of one or more applications 1264A-R, as well as virtualization if implemented are collectively referred to as software instance(s) 1252. Each set of applications 1264A-R, corresponding virtualization construct (e.g., instance 1262A-R) if implemented, and that part of the hardware 1240 that executes them (be it hardware dedicated to that execution and/or time slices of hardware temporally shared by software containers 1262A-R), forms a separate virtual network element(s) 1260A-R.

The virtual network element(s) 1260A-R perform similar functionality to the virtual network element(s) 1230A-R. This virtualization of the hardware 1240 is sometimes referred to as network function virtualization (NFV)). Thus, NFV may be used to consolidate many network equipment types onto industry standard high volume server hardware, physical switches, and physical storage, which could be located in for example data centers and customer premise equipment (CPE). However, different embodiments of the invention may implement one or more of the software container(s) 1262A-R differently. While embodiments of the invention are illustrated with each instance 1262A-R corresponding to one VNE 1260A-R, alternative embodiments may implement this correspondence at a finer level granularity; it should be understood that the techniques described herein with reference to a correspondence of instances 1262A-R to VNEs also apply to embodiments where such a finer level of granularity and/or unikernels are used.

The third exemplary implementation in FIG. 12 is a hybrid network device 1206, which includes both custom ASICs/proprietary OS and COTS processors/standard OS in a single or a single card within a node. In certain embodiments of such a hybrid network device, a platform virtual machine (VM), such as a VM that that implements the functionality of the special-purpose network device 1202, could provide for para-virtualization to the hardware present in the hybrid network device 1206.

The method as described in the present disclosure may provide several advantages over currently existing CPU-load based process schedulers:

Using the described method, it may be possible to obtain a deterministic execution environment when consolidating several new or legacy applications on a common hardware with shared resources. A deterministic execution environment makes it possible to enable the co-location of processes, i.e. locating the processes in different cores, different nodes, different CPUs, etc, without suffering a performance impact due to shared resource congestion. A deterministic execution environment removes the need for hardware overprovisioning, which results in a major cost-saving for large-scale systems. The processes may thus be provided with an execution environment that guarantees them their share of shared resources. It is thus less likely that they fail their execution due to starvation reasons.

The described method may utilize a mechanism that learns from results on earlier deployments of the system and the OS scheduler on one or many nodes. This learning mechanism is typically based on, but not limited to, machine learning and statistical methods. The method may use information from previous scheduling- and allocation scenarios, made by the node but also decisions made by other nodes may be considered, and how these scenarios affected the system performance. A more efficient process allocation and process scheduling will increase system performance.

The described method may be fully automatic. However, the system designer may also have a possibility to manually enter scheduling and allocation constraints whenever desired. An automatic system reduces the need for operational and maintenance, thus reducing the operational cost.

The described method may comprise a decision support model that will be generated from the outside of the node on which the processes are being executed; i.e. only performance counters may have to be extracted from the node. The decision support model may survive node restarts and system upgrades and provides a starting-point for new system deployments.

Consolidating several applications on common hardware is a major cost-saving factor for most large-scale systems, such as telecommunication systems as well as any other massive server deployment The described method may be applicable for handling scheduling of many types of software units, such as processes, containers or virtual machines, which makes it suitable for deployment in a cloud environment.

The invention claimed is:

1. A method for enabling scheduling of processes in a network comprising a plurality of network nodes, each network node having a plurality of processor cores and associated hardware resources and applications running on the network node, the method comprising:
 determining low-level metrics for hardware resources shared among processes running on each network node, in which the low-level metrics, for each network node, include operation of respective individual processor core of the plurality of processor cores, based on the associated hardware resources and the processes running on the respective network node;
 determining system-level metrics associated with the applications running on each network node;
 providing, from each of said network nodes, said low-level metrics and system-level metrics to a control node;
 determining, in the control node, based on a correlation between said low-level metrics and said system-level metrics, constraints, instructions, or both constraints and instructions, concerning on which network nodes and processor cores to execute said processes and when to execute said processes;
providing, from the control node to each of said network nodes, a message comprising said constraints, instructions, or both constraints and instructions;
scheduling and allocating, in each network node, processes on the processor cores of the network node based on said constraints, instructions, or both constraints and instructions, in said message; and
providing, from the control node, measurement instructions to at least a subset of the network nodes, the measurement instructions comprising a defined subset of which low-level metrics, system-level metrics, or both low-level metrics and system-level metrics, the network nodes are to determine;
wherein the low-level metrics are determined by counting a number of hardware events.

2. The method according to claim 1, wherein the measurement instructions comprising instructions to measure one or more low-level metrics that affect the system-level metrics.

3. The method according to claim 1, comprising determining, by said control node, from said low-level metrics how a process utilizes the shared hardware resources and determining if there is a correlation between the low-level metrics for the process and how the applications running on the network nodes are performing by comparing the low-level metrics for the process with the system-level metrics.

4. The method according to claim 1, comprising the control node determining instructions concerning which processes to execute on which network nodes and on which processor cores to execute said processes, said instructions providing one or more of the following:
a first process and a second process to run on the same core;
a first process and a second process to run on different cores;
a first process to only run on a first core; and
a first process to be the only process running on a first core.

5. The method according to claim 1, comprising the control node determining constraints concerning which processes to execute on which network nodes and on which processor cores to execute said processes, said constraints providing one or more of the following:
a first process and a second process to not run on the same core;
a first process and a second process to not run on cores sharing the same hardware resources;
a first core to not have any scheduled processes;
a first process to not use more than a defined amount of hardware resources;
a first process to not cause more than a defined number of cache misses per second; and
a first process to not cause more than a defined number of floating point instructions when co-located on a first core with a second process.

6. The method according to claim 1, comprising, by an operating system in each respective network node, determining that the instructions received from the control node does not exceed hardware resource limitations of the respective network node, prior to scheduling and allocating in accordance with the instructions.

7. The method according to claim 1, comprising, by an operating system in each respective network node, determining that the constraints received from the control node are compatible with hardware resource limitations of the respective network node, prior to scheduling and allocating the processes on the respective network node.

8. The method according to claim 1, further comprising, by the control node, determining available hardware resources of the network nodes prior to determining instructions concerning which processes to execute on which network nodes and on which processor cores to execute said processes.

9. The method according to claim 1, further comprising determining operating system (OS)-level metrics, software-level metrics, or both OS-level metrics and software-level metrics.

10. A system for enabling scheduling of processes in a network comprising a plurality of network nodes, each network node having a plurality of processor cores and associated hardware resources and applications running on the network node, the system comprising:
processing circuitry; and
a memory containing instructions which, when executed by the processing circuitry, cause the system to:
determine low-level metrics for hardware resources shared among processes running on each node, in which the low-level metrics, for each network node, include operation of respective individual processor core of the plurality of processor cores, based on the associated hardware resources and the processes running on the respective network node;
determine system-level metrics associated with the applications running on each network node;
provide said low-level metrics and system-level metrics to a control node;
determine, based on a correlation between said low-level metrics and said system-level metrics, constraints, instructions, or both constraints and instructions, concerning on which network nodes and processor cores to execute said processes and when to execute said processes;
provide, to each of said network nodes, a message comprising said constraints, instructions, or both constraints and instructions;
schedule and allocate, in each network node, processes on the processor cores of the network node based on said constraints, instructions, or both constraints and instructions, in said message; and
provide measurement instructions to at least a subset of the network nodes, the measurement instructions comprising a defined subset of which low-level metrics, system-level metrics, or both low-level metrics and system-level metrics, the network nodes are to determine;
wherein the low-level metrics are determined by counting a number of hardware events.

11. A network node for enabling scheduling of processes, the network node having a plurality of processor cores and associated hardware resources and being configured to run applications on the network node, the network node comprising:
processing circuitry; and
a memory containing instructions which, when executed by the processing circuitry, cause the network node to:
determine low-level metrics for hardware resources shared among processes running on the network node, in which the low-level metrics include operation of respective individual processor core of the plurality of processor cores, based on the associated hardware resources and the processes running on the network node;

determine system-level metrics associated with the applications running on the network node;

provide said low-level metrics and system-level metrics to a control node;

receive, from the control node, a message comprising constraints, instructions, or both constraints and instructions, concerning on which processor cores to execute processes and when to execute said processes;

schedule and allocate processes on the processor cores of the network node based on said constraints, instructions, or both constraints and instructions, in said received message; and receive, from the control node, measurement instructions comprising a defined subset of which low-level metrics, system-level metrics, or both low-level metrics and system-level metrics, the network node is to determine;

wherein the low-level metrics are determined by counting a number of hardware events.

12. The network node according to claim 11, wherein the measurement instructions comprising instructions to measure one or more low-level metrics that affect the system-level metrics.

13. The network node according to claim 11, further comprising an operating system configured to determine that the instructions received from the control node does not exceed hardware resource limitations of the network node, and when the hardware resource limitations are not exceeded, schedule and allocate in accordance with the instructions.

14. The network node according to claim 11, further comprising an operating system configured to determine that the constraints received from the control node are compatible with hardware resource limitations of a respective network node, and when compatible, schedule and allocate the processes on the network node in accordance with the constraints.

15. A control node for enabling scheduling of processes in a network comprising a plurality of network nodes, each network node having a plurality of processor cores and associated hardware resources and applications running on the network node, the control node comprising:

processing circuitry; and a memory containing instructions which, when executed by the processing circuitry, cause the network node to:

receive, from said plurality of network nodes, low-level metrics for hardware resources shared among processes running on each network node, in which the low-level metrics, for each network node, include operation of respective individual processor core of the plurality of processor cores, based on the associated hardware resources and the processes running on the respective network node;

receive, from said plurality of network nodes, system-level metrics associated with applications running on each network node;

determine, based on a correlation between said low-level metrics and said system-level metrics, constraints, instructions, or both constraints and instructions, concerning on which network nodes and processor cores to execute said processes and when to execute said processes;

provide to each of said network nodes, a message comprising said constraints, instructions, or both constraints and instructions; and provide to at least a subset of the network nodes, measurement instructions comprising a defined subset of which low-level metrics, system-level metrics, or both low-level metrics and system-level metrics, the network nodes are to determine;

wherein the low-level metrics are determined by counting a number of hardware events.

16. The control node according to claim 15, wherein the measurement instructions providing instructions to measure one or more low-level metrics that affect the system-level metrics.

* * * * *